United States Patent
Dinh et al.

(10) Patent No.: US 6,533,472 B1
(45) Date of Patent: Mar. 18, 2003

(54) OPTICAL FIBER SPLICE CLOSURE ASSEMBLY

(75) Inventors: Cong Thanh Dinh, Memphis, TN (US); Mark R. Drane, Germantown, TN (US)

(73) Assignee: Alcoa Fujikura Limited, Brentwood, TX (US)

( * ) Notice: Subject to any disclaimer, the term of this patent is extended or adjusted under 35 U.S.C. 154(b) by 0 days.

(21) Appl. No.: 09/691,515

(22) Filed: Oct. 18, 2000

Related U.S. Application Data

(60) Provisional application No. 60/160,436, filed on Oct. 19, 1999.

(51) Int. Cl.[7] .............................................. G02B 6/255

(52) U.S. Cl. ......................................... 385/95; 385/135

(58) Field of Search ........................... 385/95, 134–139

(56) References Cited

U.S. PATENT DOCUMENTS

| | | | |
|---|---|---|---|
| 4,549,040 A | | 10/1985 | Goetter |
| 4,620,815 A | | 11/1986 | Goetter |
| 4,679,896 A | | 7/1987 | Krafcik et al. |
| 4,793,682 A | | 12/1988 | Cooper |
| 4,805,979 A | | 2/1989 | Bossard et al. |
| 5,185,845 A | | 2/1993 | Jones |
| 5,245,133 A | | 9/1993 | DeCarlo et al. |
| 5,251,373 A | | 10/1993 | DeCarlo et al. |
| 5,515,472 A | | 5/1996 | Mullaney et al. |
| D372,897 S | | 8/1996 | Curry et al. |
| 5,556,060 A | | 9/1996 | Bingham et al. |
| 5,631,993 A | * | 5/1997 | Cloud et al. ................. 385/135 |
| 5,835,658 A | * | 11/1998 | Smith ......................... 385/136 |
| 5,862,290 A | * | 1/1999 | Burek et al. ................ 385/135 |
| 6,226,434 B1 | * | 5/2001 | Koshiyama et al. ........ 385/134 |

OTHER PUBLICATIONS

Kobayashi et al., "Optical Cable Joint Cabinets and Closures for Subscriber Loops", Review of the Electrical Communications Laboratories –vol. 34 No. 6, pp. 661–667, The Research and Development Headquarters, Nippon Telegraph and Telephone Corporation. (1986).

"FOSC 400 D5 Fiber Optic Splice Closures", pp. 1–12, Aug. 1996, Practice and Installation Instructions, Raychem Corporation, Telecommunications Division, Fuquay–Varina, NC.

FOSC ACC Cable Seal 2–XX, Oval Port Seal Installation Instructions, 2 pages, Aug. 1996, Raychem Corporation, Telecommunications Division, Fuquay–Varina, NC.

"Coyote® Runt Closure For Underground, Aerial and Buried Splices", pp. 1–12, Apr. 1999, Preformed Line Products, Cleveland, Ohio.

"Coyote® Product Series", pp. 2–7, 1996 Preformed Line Products, Cleveland, Ohio.

* cited by examiner

*Primary Examiner*—Khiem Nguyen
(74) *Attorney, Agent, or Firm*—Hoffmann & Baron, LLP

(57) ABSTRACT

An improved closure assembly for retaining fiber optic cables is disclosed wherein the closure assembly includes end plates having apertures for supporting the cables at the location of entry into the closure assembly. A unique gripping device is provided for retaining each cable with respect to the end plates, whereby sufficient force is applied to the cable to provide water-tight sealing at the junction of the cable and the end plate, yet with sufficient distribution of the force to avoid straining or distorting the cable. A unique optical fiber splice tray is disclosed having pivotal connectors at either end to permit attaching the trays in stacked relation, yet providing pivotal movement of each tray relative to the next adjacent tray, from either end. The trays include unique "V"-shaped integral fingers for retaining the individual optical fibers while permitting ready removal and reinsertion of the fibers for servicing of the closure assembly or the fibers.

21 Claims, 23 Drawing Sheets

OPTICAL FIBER SPLICE CLOSURE ASSEMBLY

CROSS-REFERENCE TO RELATED APPLICATIONS

The present invention relates to the field of fiber optics and enclosures therefor, and claims priority to Provisional Application No. 60/160,436, filed Oct. 19, 1999, the disclosure of which is incorporated by reference herein and made a part of this disclosure.

BACKGROUND OF THE INVENTION

1. Field of the Invention

The present invention relates generally to the field of fiber optics and, more particularly, to a hermetically sealed fiber optic splice closure assembly. Assemblies of the type under consideration are particularly suited for enclosing and housing fiber optic cables in aerial, pedestal, below grade, or buried applications.

2. Description of the Related Art

Fiber optic splice closures are generally required to retain fiber optic cables firmly in position such that the optical fibers contained within the cables may be joined at splice junctions such as fusion welds within splice trays supported within the closure assembly. Generally it is required that the closure assembly be hermetically sealed and that the entry locations of the fiber optic cables into the closure assembly also be hermetically sealed and water resistant.

One problem which is generally encountered in attaching the cables with respect to the closure assembly is that water-resistant conditions generally require relatively rigid connections between the closure assembly and the cables, thus presenting the possibility of applying substantial forces to the cable which may cause deformation or strain to the cable. Furthermore, when the cable enters the closure assembly, the individual splice trays are intended to retain the individual delicate optical fibers emanating from the cables in a manner which does not deform the fibers.

As noted, the splice trays are intended to retain the delicate optical fibers in position without distorting the fibers or the spliced fusion welds. In order to service the system, it is generally required to lift the individual splice trays away from one another to perform service on the cables and the fibers. In general, the fibers within the tray are provided with excessive footage to permit separable movement of the trays relative to each other to permit servicing crews to perform tasks on the fibers.

We have invented a closure assembly which provides unique water-resistant attachment of the cables thereto without subjecting the cables of the optical fibers therein to strain in causing stresses. Moreover, we have invented unique fiber optic trays capable of supporting the fibers with ready removal and reinsertion capability, while also providing pivotal attachment capability of the trays at both ends.

SUMMARY OF THE INVENTION

The illustrated embodiment of the optical splice closure assembly is for an in-line splice. However, as would be readily understood by those skilled in the art, the features of the present invention may also be similarly and beneficially applied to a butt-splice. The closure assembly is hermetically sealed and remains air-tight to prevent water from entering the case.

The optical splice closure assembly according to the invention includes a housing assembly which houses and encloses a splice tray support assembly. The housing assembly is generally formed by a pair of closely similar, opposed main housing or body members which are joined together in sealed relationship to define an axially elongated generally cylindrical center storage chamber. The opposite ends of the housing members are respectively closed by end plate assemblies that are releasably and sealingly engaged with the housing members in a manner shown in the drawings and subsequently described. The end plate assemblies are preferably made of a durable rigid material such as aluminum. One or more fiber optic cables may enter and exit the housing assembly through suitable openings in the end plate assemblies. The fiber optic cables are sealed and secured within the housing assembly by the end plate assemblies.

Although the housing body components and the end plates could be formed from a variety of different materials using different manufacturing techniques, in the embodiment shown, they are preferably injection molded from a durable glass-filled high-density thermoplastic.

The two main housing members are closely similar in overall shape and construction. Accordingly, a description of one is to be considered as equally applicable to the other unless otherwise noted. In the preferred embodiment shown in the drawings, each housing member has an elongated, semi-cylindrical configuration which defines a somewhat shell-like body with a main outer semi-cylindrical wall that has laterally extending clamping flanges extending along each longitudinal side. The flanges are in diametrical alignment relative to the wall and define flat sealing and clamping surfaces that are continuous along each side.

The main wall is reinforced by radially extending, axially spaced ribs formed integrally with the wall. Each of the ribs extends circumferentially about the wall and joins at its ends with the clamping flanges.

The clamping together of the main body components may be accomplished with a variety of different releasable fasteners or clamping means. In the subject embodiment, however, the preferred form comprises a plurality of threaded bolt members extending through associated openings in the clamping flanges and secured by corresponding nut members. The two main housing member halves may thus be clamped together by the nut and bolt members. The actual clamping and sealing arrangement will subsequently be described.

The longitudinally spaced axial ends of each of the body members are provided with an inwardly extending end flange section having a central groove/recess configured and sized so as to receive the outer peripheral edge of the associated end plate assemblies. Similarly, the clamping flanges include associated grooves/recesses in communication with the grooves/recesses in the end flange sections. Associated with the recesses and the longitudinally extending clamping surfaces of the clamping flanges on each of the housing members is a resilient sealing gasket member. The gaskets are bonded into position in each of the main body members. The gasket members used in the subject embodiment generally comprise semi-cylindrical end portions spaced and contoured to fit within the spaced recesses. The arcuate semi-cylindrical end portions are joined by relatively narrow longitudinally extending strips. Note that the strips run closely adjacent the inner periphery of the wall and the accurate end portions extend into the associated recesses.

It should be understood that the end plate assemblies are sized and shaped so as to be closely and tightly received in the recesses so as to be sealingly engaged about their outer periphery by the associated gasket portions in the bottom of the recesses. The end plate assemblies are preferably molded from the same material as the main body sections. They have a circular outer periphery of an axial width to be closely received in the recesses. The assemblies are preferably comprised of three separate pieces comprised of a central section and duplicate outer sections which fit together to provide a continuous outer periphery having a plurality of outwardly extending sealing ribs formed thereabout. The ribs are arranged to sealingly engage the gasket portion located in the bottom of the recess in the end flange section. The three separate pieces of the end plate assemblies allow the closure assembly to be disassembled without cutting or disturbing the fiber optic cable as well as allows the cables to be placed in position prior to joining the end plate members. All components used in constructing the closure assembly may be removed including any grommets or sealants directly on the cable. The central and outer sections of the end plate assemblies are each joined by a pair of bolts extending through vertically aligned openings.

Suitable cable openings are formed centrally of the end plate assemblies and any desired number of sizes could be provided. In the preferred embodiment, there are four cable openings. Those openings which are not utilized may be sealed by using suitable plugs.

In order to provide strain relief, two washer halves are provided having fingers which extend around and clamp the cable entering the closure assembly. The fingers have a gripping surface that faces the cable. A lip is provided on the outside external edge to locate the band/hose clamp and keep it from sliding off of the fingers. The strain relief washers prevent the cable from movement side-to-side due to a bending force and from axial movement when the cable is moved along the cable direction.

Two strain relief washers are used on each cable entering the closure assembly, one of the outside and one on the inside. The outside washer edges fit into corresponding grooves in the end plate assemblies. Once in place, when the band clamps are tightened, the washer edges are forced to deflect inside the groove causing additional movement resistance and "locking" the cable in place in the endplate. A flat or bump may be added to the washer to fit against a corresponding feature in the groove to prevent the cable from twisting or torsion movement.

It should also be noted that, in a preferred embodiment, each opening in the end plate assemblies has a cable strength member bracket located inside the closure to secure elongated wire-like strength member of the cables.

Broadly stated, the invention is directed to an enclosure for supporting at least one fiber optic cable, which comprises a housing having first and second end portions, at least one end plate located at each end portion, each end plate defining at least one aperture for supporting at least one fiber optic cable extending therethrough. The invention further comprises a device for gripping the at least one fiber optic cable adjacent at least one of the end plates, the gripping device substantially encircling the cable and having at least one extension adapted for attachment to the at least one end plate to fix the axial position of the at least one cable gripped thereby.

The invention also relates to a splice tray for supporting optical fibers, which comprises a tray for supporting the optical fibers in an axial direction, and a tray-to-tray connecting device located at each end of the tray, each connecting device being comprised of at least one elongated generally cylindrical member positioned adjacent at least one clamp member adapted to engagingly receive in clamped relation, one of such cylindrical members attached to an adjacent similar tray in a manner to permit relative pivotal movement therebetween, such that at least two of such trays may be stacked in connected relation whereby the trays may be pivotally rotated with respect to each other from either end.

The invention also relates to a device for supporting a fiber optic cable with respect to an enclosure, the enclosure having a housing having at least two end portions, and an end plate at each end portion defining at least one aperture for reception of the fiber optic cable, which comprises a gripping device structured to substantially encircle the cable at a location adjacent at least one of the end plates, the gripping device having at least two gripping members adapted to move toward and away from an outer surface portion of the cable between positions whereby the cable is gripped and released, respectively. A member, preferably in the shape of a split washer, extends generally radially from the gripping device at at least one end portion thereof, the member adapted to be fixedly attached to the end plate, and an encircling member adapted to encircle the gripping device and to selectively apply inward force to said gripping device to cause the gripping device to grip the cable.

BRIEF DESCRIPTION OF THE DRAWINGS

Preferred embodiments of the invention are described hereinbelow with reference to the drawings, wherein.

DETAILED DESCRIPTION OF THE PREFERRED EMBODIMENT

Figure 1:
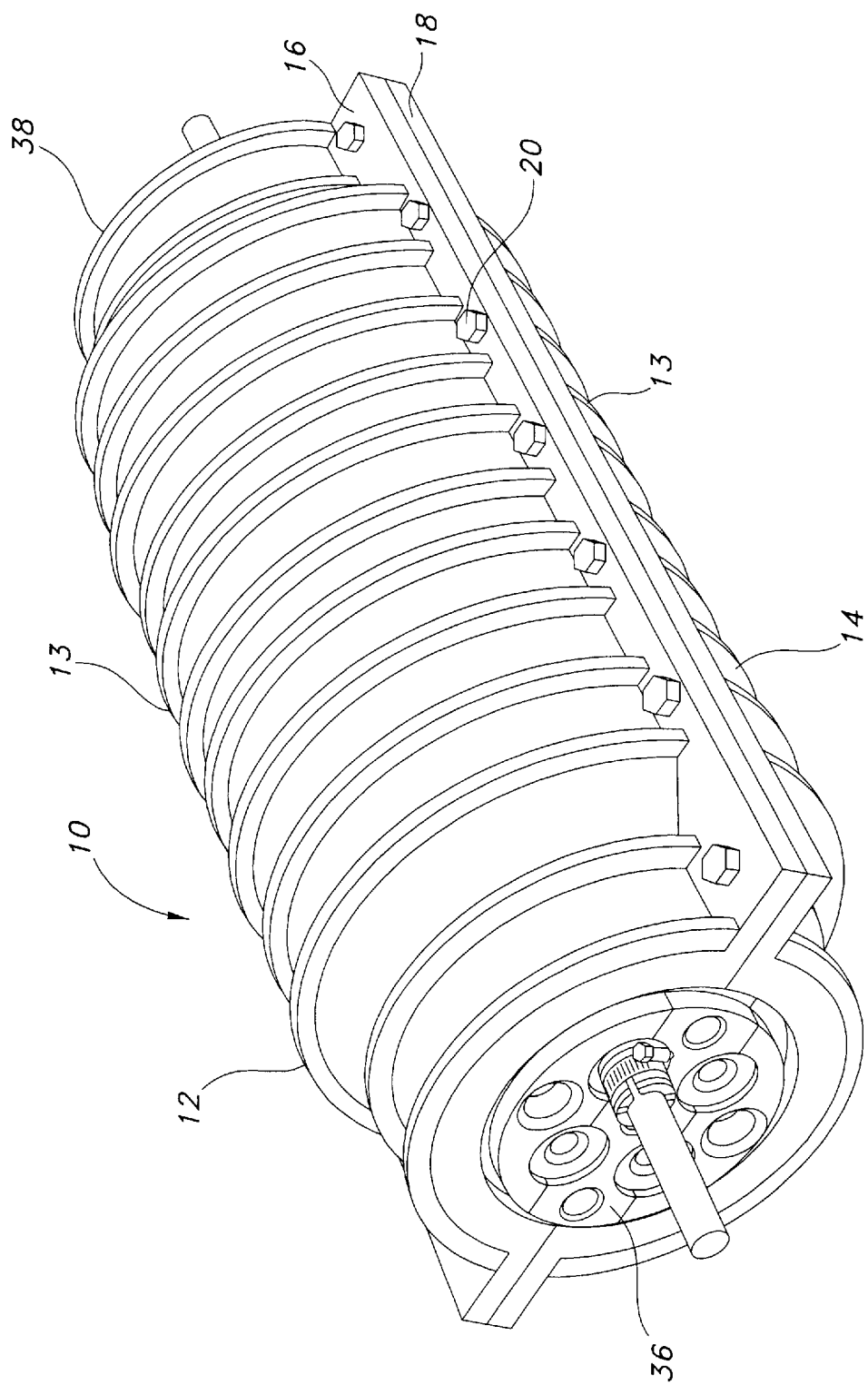
FIG. 1 is a right side perspective view from above, of the fiber optic cable splice closure assembly constructed according to the invention and illustrating the fiber optic cable strain relief support feature.

Referring initially to FIG. 1, there is illustrated an optical splice closure assembly 10 constructed according to the present invention and defining longitudinal axis "A—A".

The closure assembly 10 is shell-like and includes semi-cylindrical upper housing body member 12 and semi-cylindrical lower housing body member 14, each having respective axially extending flanges 16, 18 attached by suitable fasteners preferably in the form of bolts 20 in apertures 22 with gaskets 24, 26 positioned between the flanges 16, 18 to provide hermetic sealing of the enclosure. Upper housing body member 12 and lower housing body member 14 are provided with respective arcuate recesses 28, 30 for reception of the arcuate portions 32, 34 of gaskets 24, 26.

Circumferential ribs 13 extend about the housing body members 12, 14 and join at their ends with respective clamping flanges 16, 18.

Figure 2:
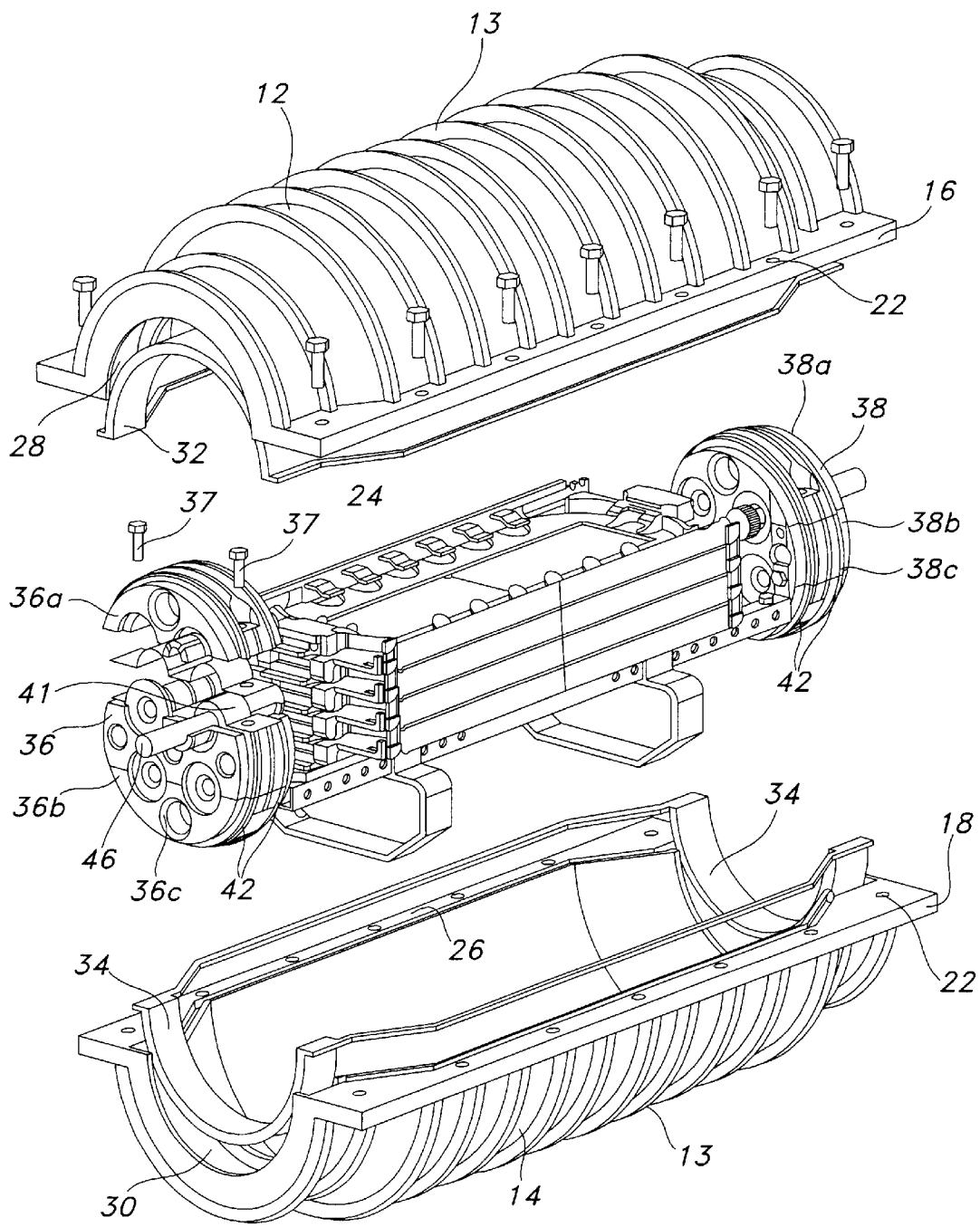
FIG. 2 is a right side perspective view from above, of the fiber optic cable closure assembly shown in FIG. 1, with components separated for convenience of illustration and to show the optical fiber splice trays contained therein.
Figure 13:
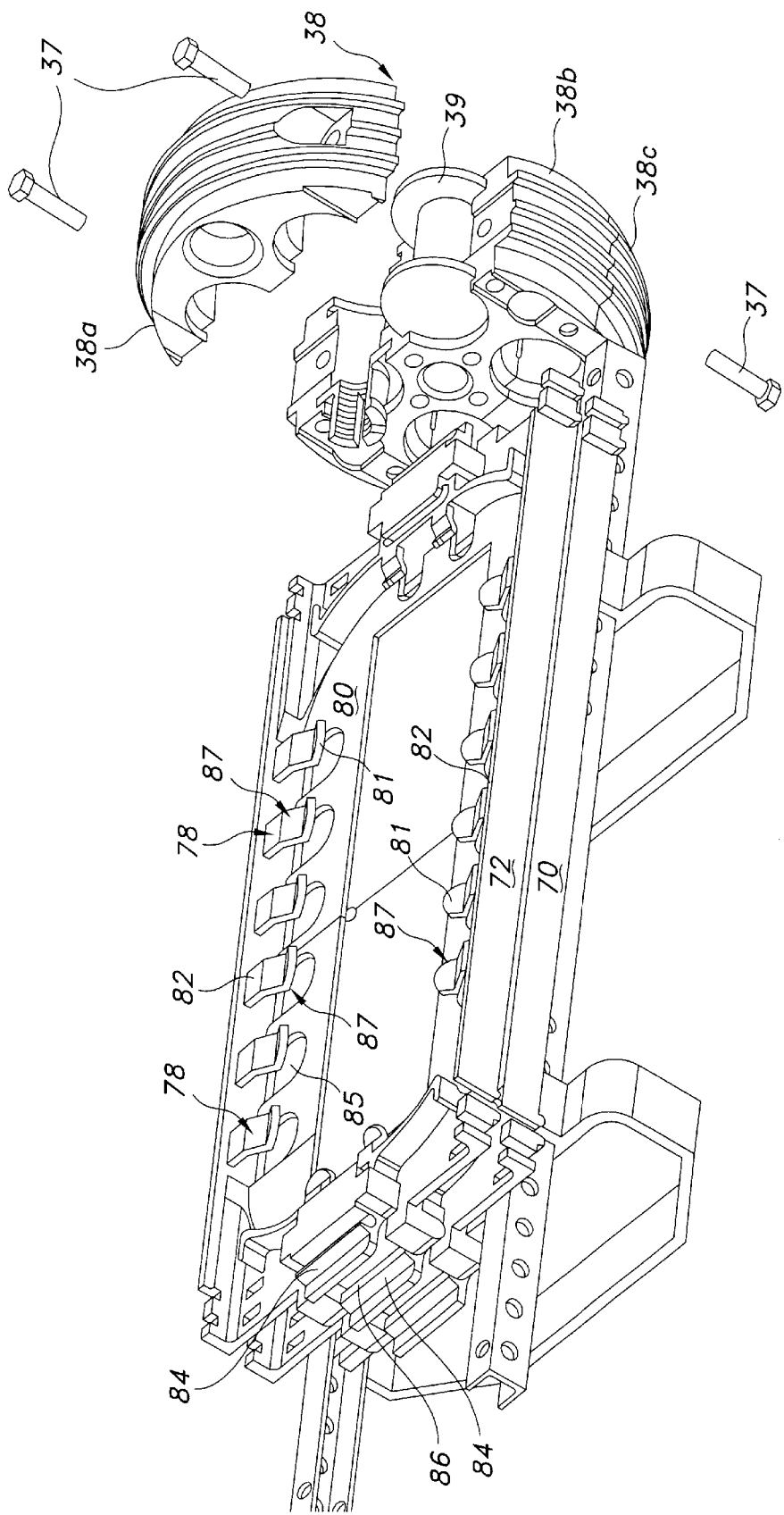
FIG. 13 is a perspective view, greatly enlarged, of the splice trays and one closure end plate, illustrating the split strain relief support sleeve in partially assembled condition in one fiber optic cable aperture, with another of the fiber optic cable apertures in the end plate plugged for non-use.
Figure 14:
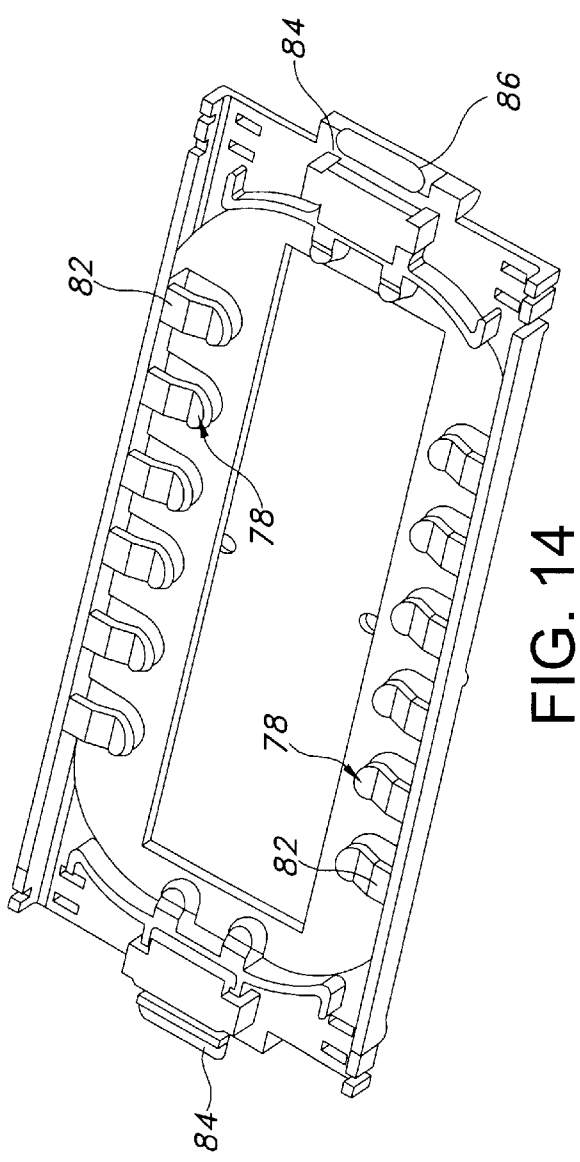
FIG. 14 is a top perspective view of a splice tray constructed according to the present invention.
Figure 15:
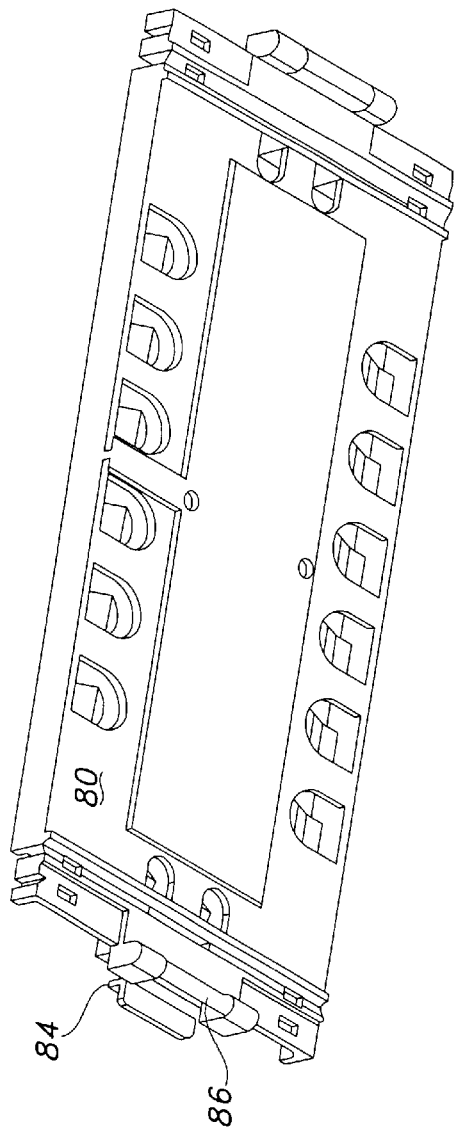
FIG. 15 is a bottom perspective view of the splice tray of FIG. 14.

Each end of closure assembly 10 includes end plate assemblies 36, 38, each of which is comprised of three separate sections 36a, 36b and 36c, and 38a, 38b and 38c, respectively as best shown in FIG. 2. The three sections of each end plate 36, 38 are respectively assembled to support fiber optic cables in apertures 40. For example, exemplary cable 46 is supported in exemplary aperture 40 in end plates 36, 38 as shown. End plates 36, 38 may be conveniently disassembled by removing exemplary assembly bolts 37, without cutting or disturbing the cables. The end plates include peripheral ribs 42, which engage arcuate gasket sections 32, 34 when upper housing body 12 and lower housing body 14 are bolted together as shown in FIG. 1. When an aperture 40 is not needed, it may be plugged by water-tight plug 39 as shown in FIG. 13.

Figure 3:
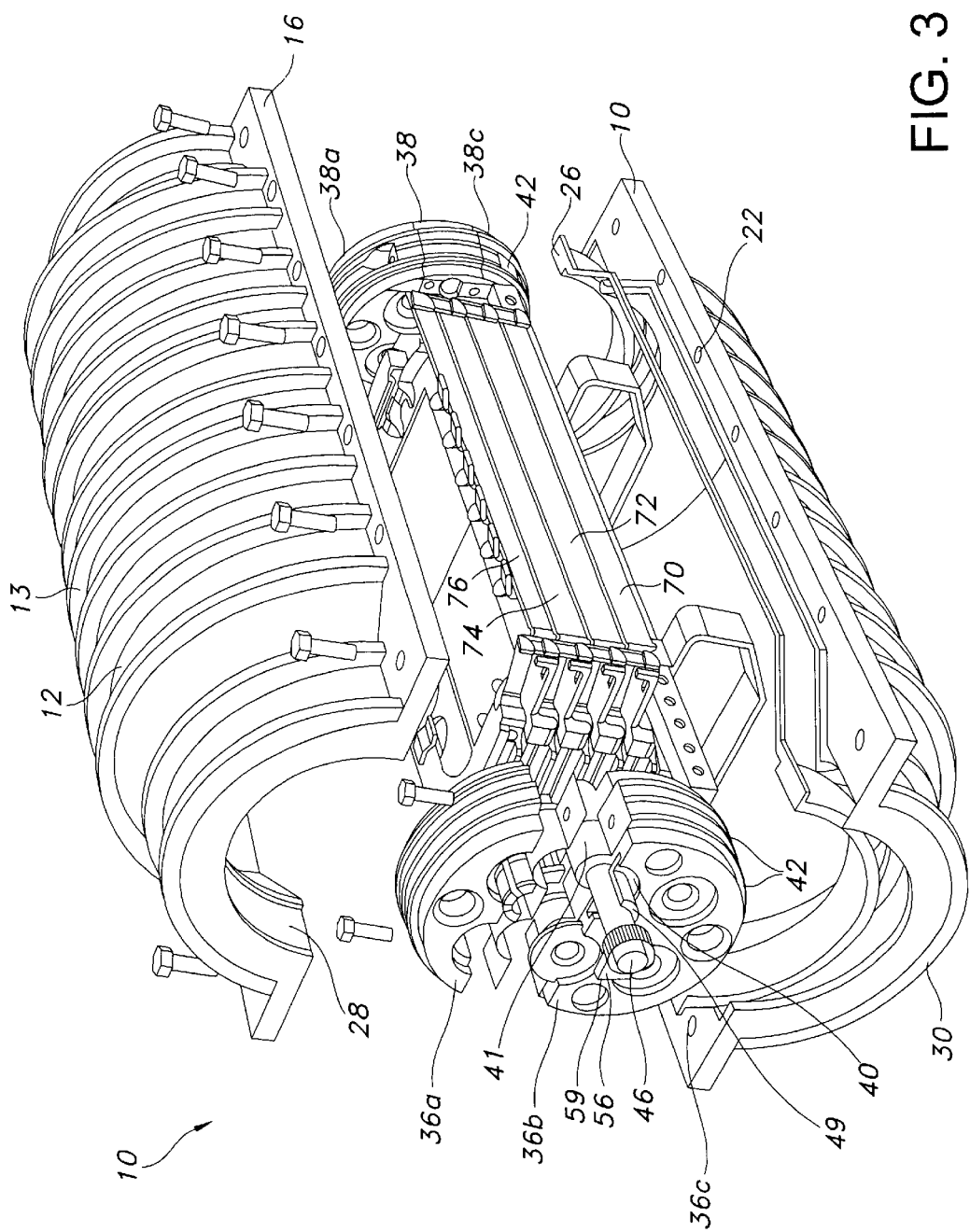
FIG. 3 is a right side perspective view from above, of the fiber optic cable closure assembly shown in FIG. 2, in partially assembled condition, and illustrating the strain relief fiber optic cable support system constructed according to the invention, with the band/hose clamp in position prior to encircling the strain relief cable support sleeve.
Figure 4:
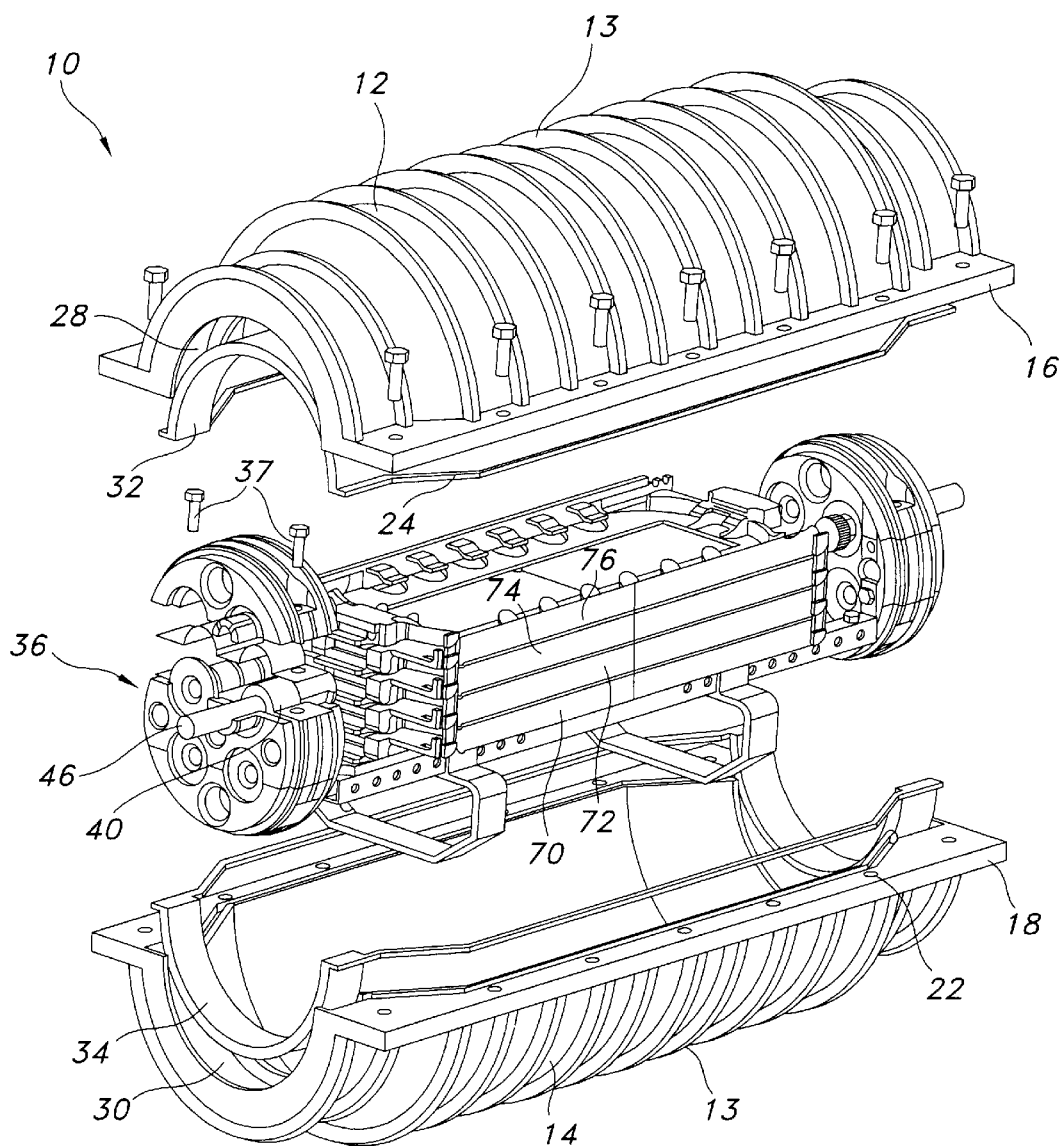
FIG. 4 is a view similar to FIG. 3, illustrating at one end, the two halves of the strain relief flanged fiber optic cable support sleeve in separate positions prior to assembly about the cable, and at the other end, the strain relief flanged fiber optic cable support sleeve in assembled condition.
Figure 5:
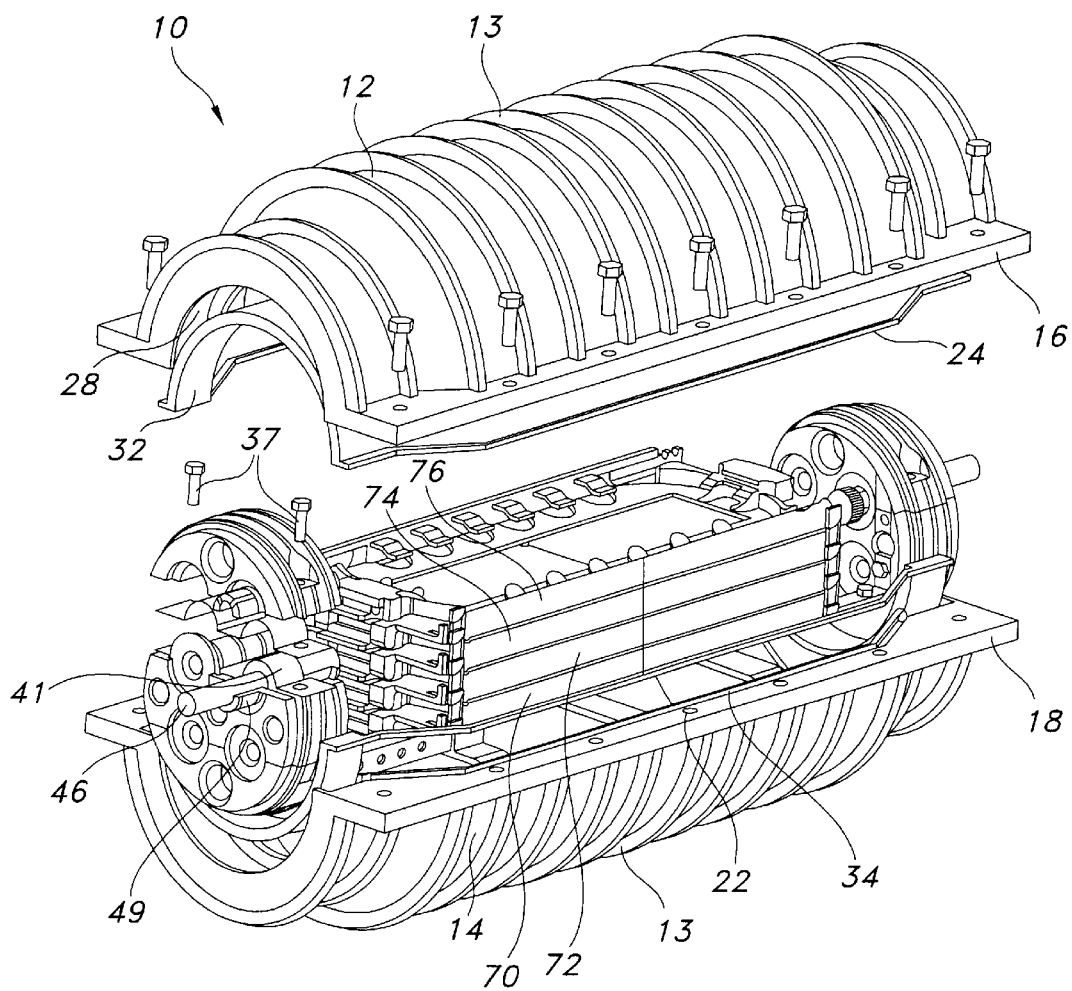
FIG. 5 a view similar to FIG. 4, illustrating the cable splice trays in assembled condition and supported on the lower half portion of the closure assembly.
Figure 6:
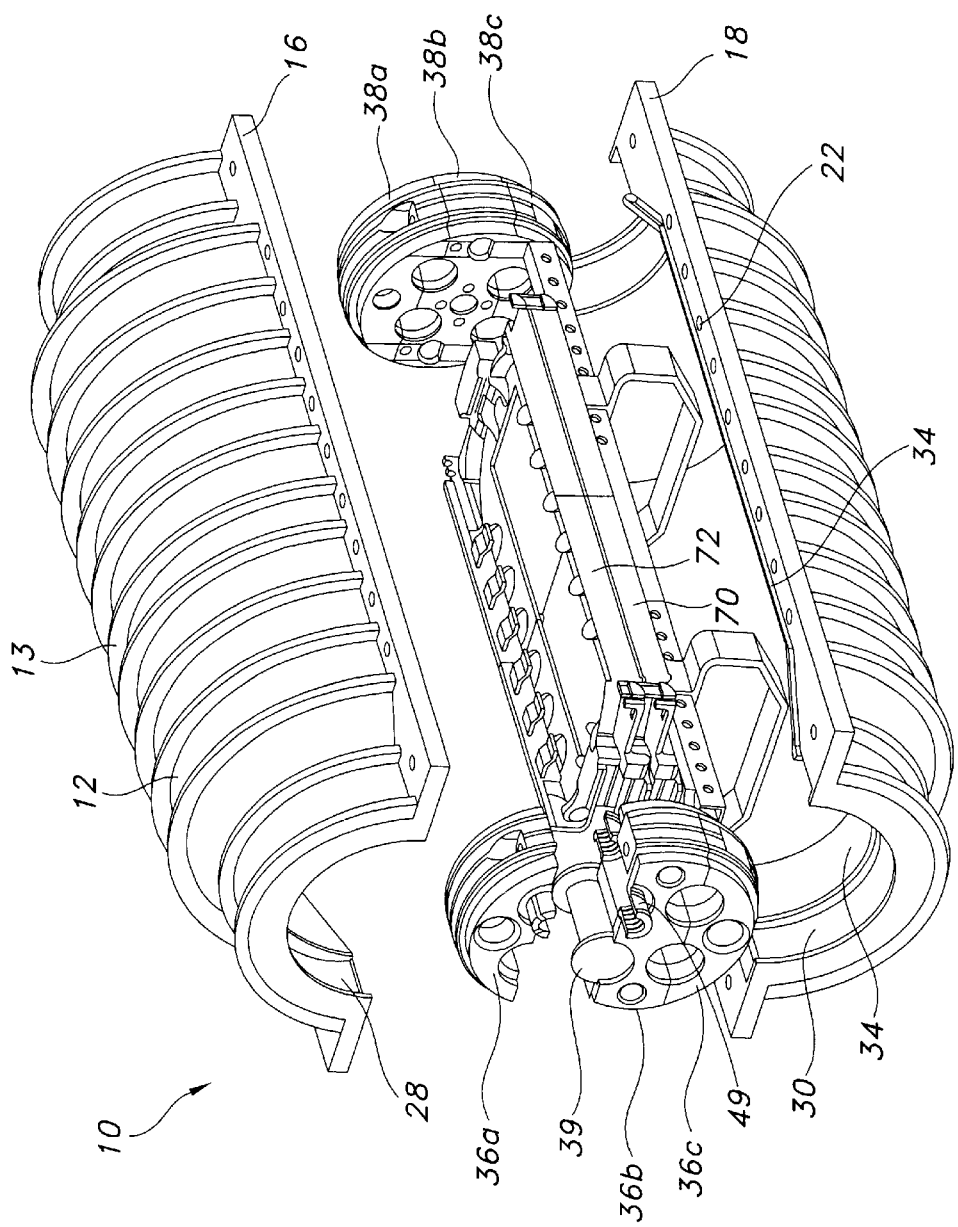
FIG. 6 is a view similar to FIG. 5, with the uppermost outer section of one of the end plates separated to illustrate both of the split strain relief flanged fiber optic cable support sleeves associated therewith.
Figure 7:
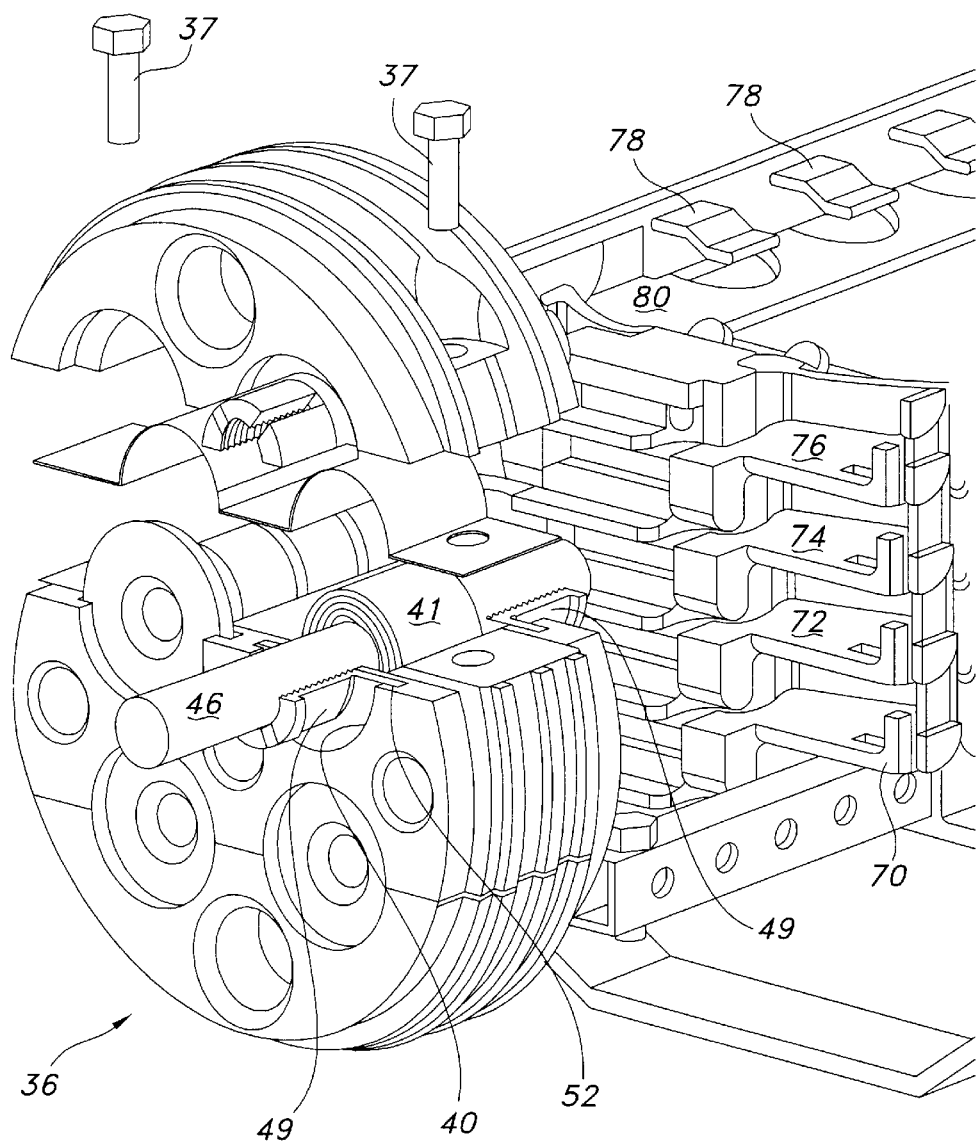
FIG. 7 is a perspective view from above, greatly enlarged, of one of the end plates of the closure assembly shown in FIGS. 1–6, with the upper outer section separated to best illustrate the split strain relief flanged fiber optic cable support sleeve.
Figure 8:
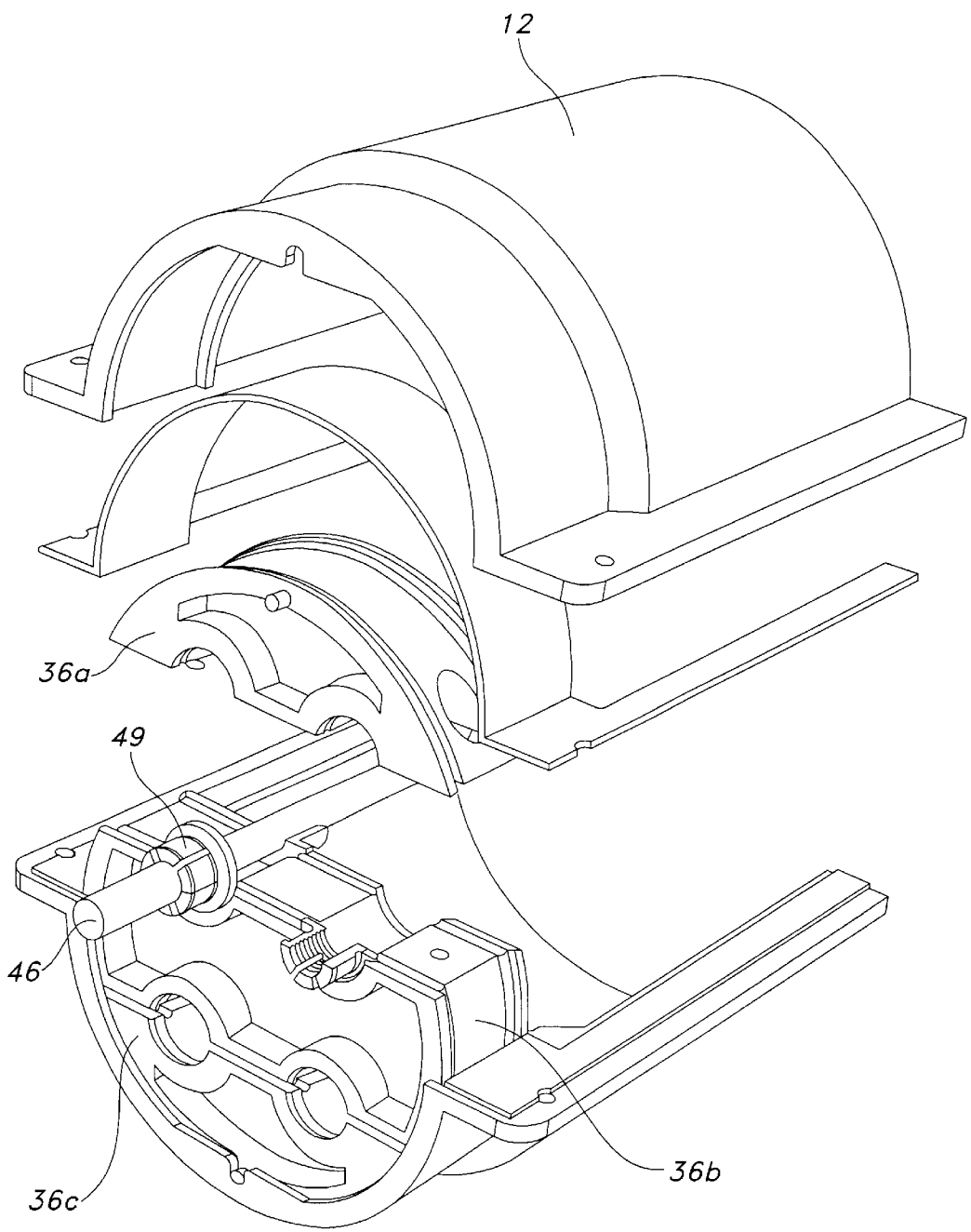
FIG. 8 is a view similar to FIG. 7, illustrating the split strain relief flanged fiber optic cable support sleeve in greater detail.
Figure 19:
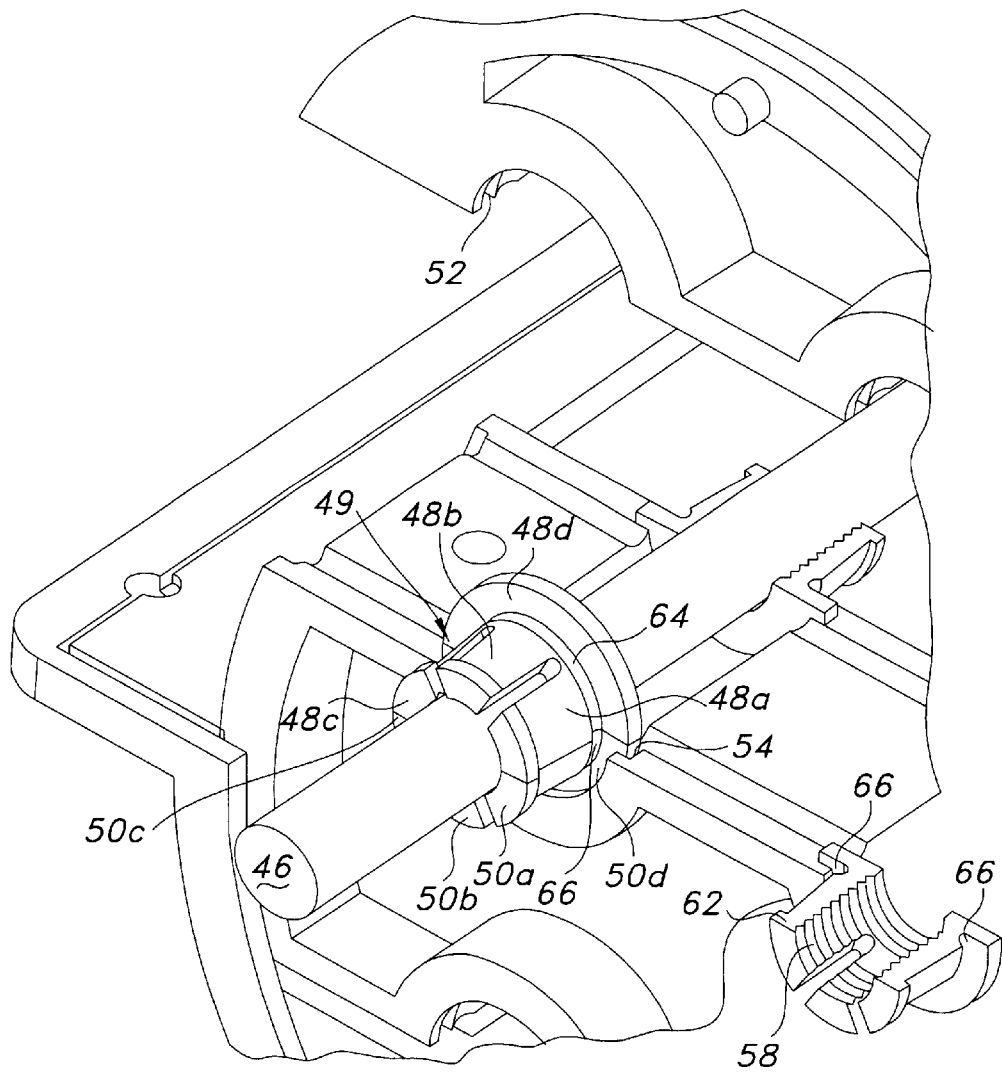
FIG. 19 is a perspective view, greatly enlarged, of one end of the closure assembly of the invention, with parts separated to illustrate the split strain relief flanged fiber optic cable support sleeve positioned on the cable.

Referring now to FIG. 3 in conjunction with FIGS. 4–10 and 19, the strain relief fiber optic cable support system according to the present invention is disclosed. As best seen in FIGS. 3, 4 and 19, exemplary fiber optic cable 46 is supported in exemplary aperture 40 by a split cable support device—or flanged bushing 49, which is in the form of a pair of washer-like halves 48d, 50d, each of which has extending axially from one face thereof, three fingers 48a, 48b, 48c, 50a, 50b and 50c, each having an arcuate cross sectional configuration and adapted to be resiliently movable in radial directions toward and away from cable 46. The washer like halves 48d, 50d are positioned within correspondingly shaped semi-circular washer-like slots 52, 54 in respective adjacent sections 36a, 36b of end plate 36 such that when the end plate is completely assembled as shown in FIG. 1 with the assembled enclosure 10, the washer like halves 48d, 50d are fixed in position and are prevented from movement in the axial direction. Flanged bushing 49 is made of a flexible resilient material, preferably a polyamide, such as nylon.

Referring again to FIGS. 3–8 and 19, the arcuate fingers 48, 50 of bushing 49 include an inner gripping surface such as best shown in FIG. 19, i.e., a plurality of inwardly extending concentric arcuate shaped ribs 58 which are made to engage and bite, fiber optic cable 46 uniformly in gripping relation, thus preventing axial movement of the cable 46 relative to support device 49 when the fingers 48a, 48b, 48c and 50a, 50b and 50c are moved radially inwardly into engagement with the outer surface of cable 46.

Figure 9:
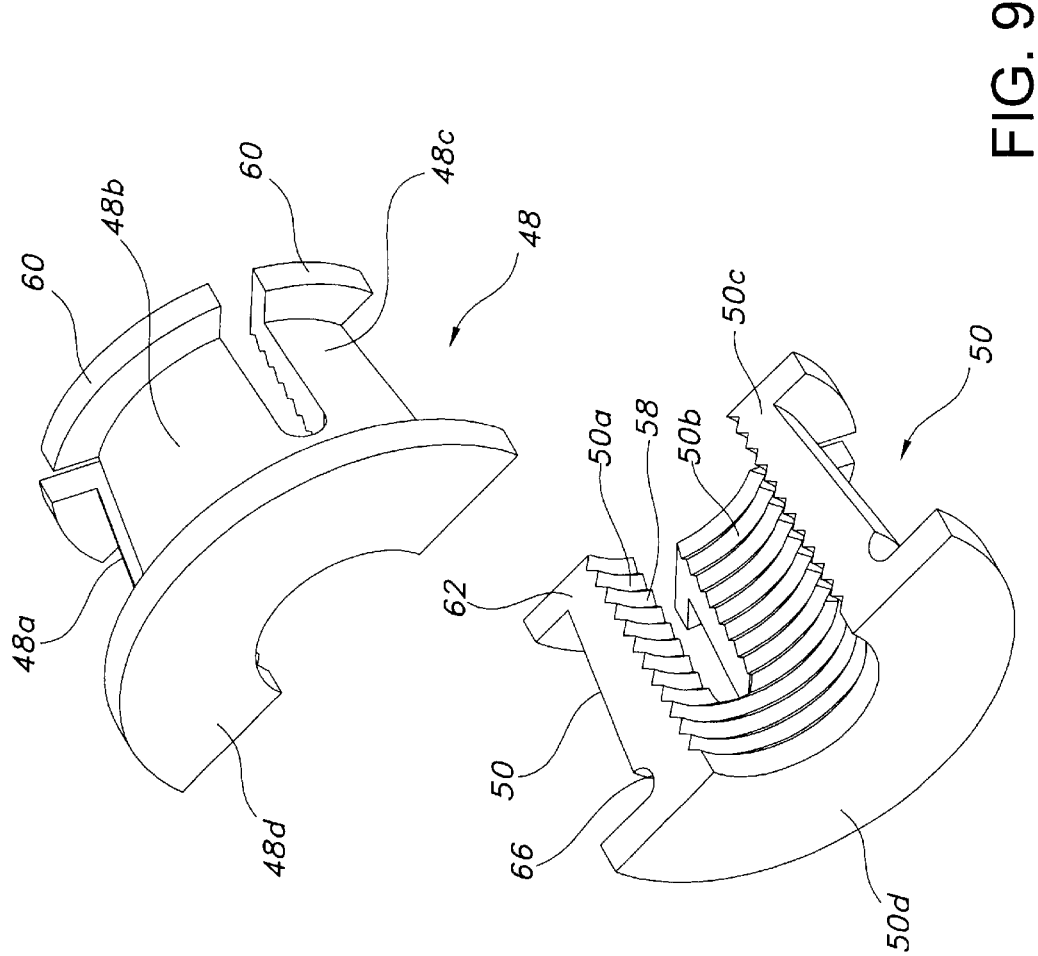
FIG. 9 is a right side perspective view from above, of the two halves of the split strain relief flanged fiber optic support sleeve.
Figure 10:
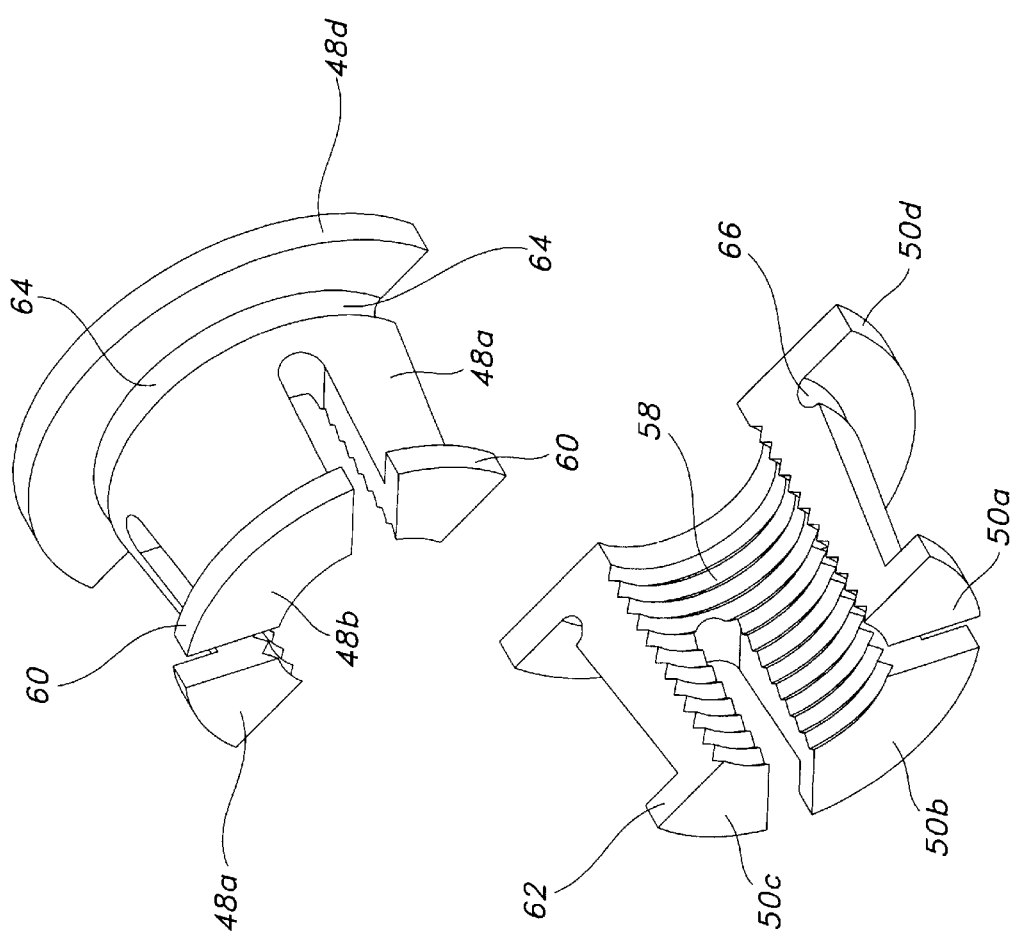
FIG. 10 is a right side perspective view from above, of the two halves of the split strain relief flanged fiber optic support sleeve shown in FIG. 9, as viewed from the opposite side.
Figure 16:
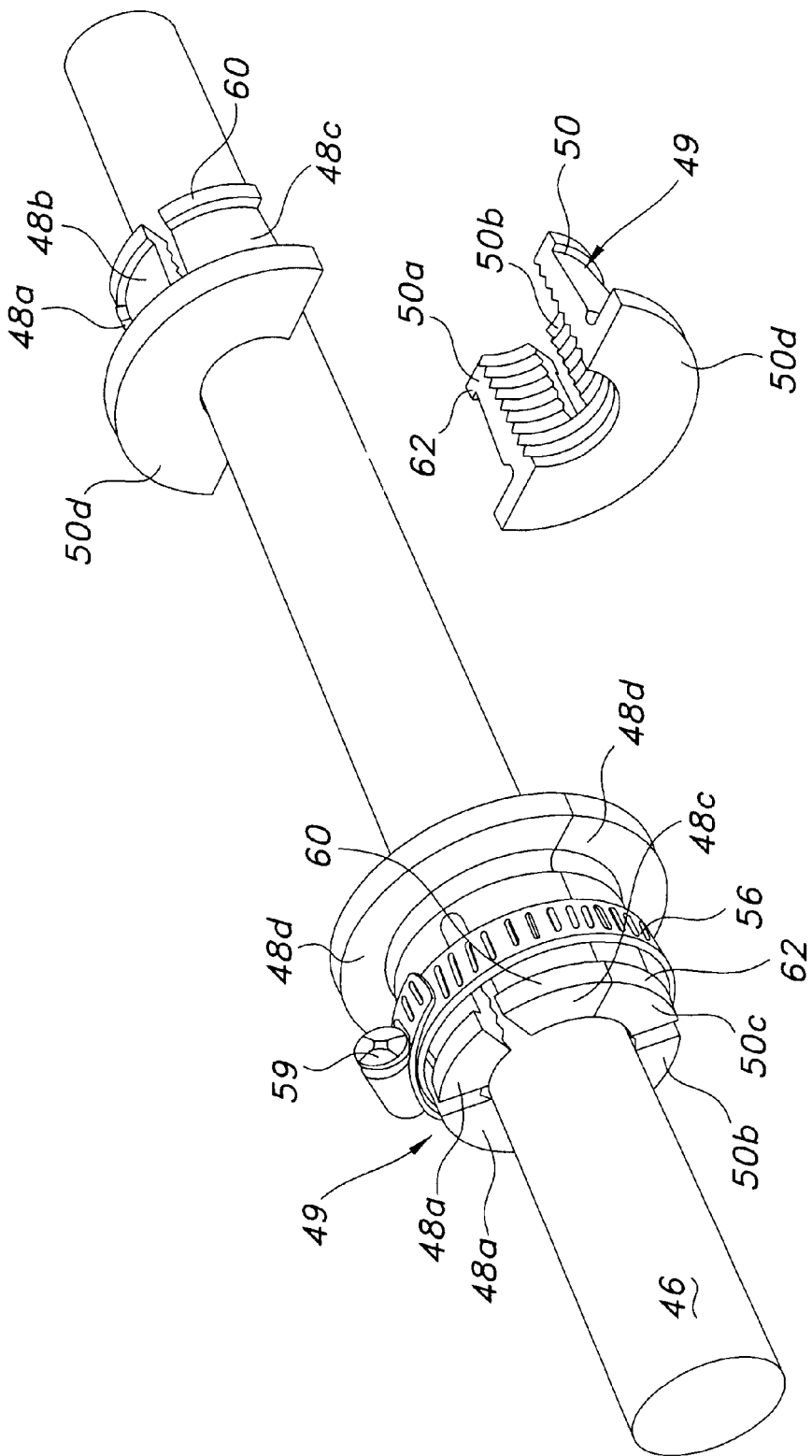
FIG. 16 is a perspective view from above, of a fiber optic cable, illustrating a completely assembled strain relief support system on one side of a closure end plate, and at the other end, a partially assembled strain relief support system according to the invention.
Figure 17:
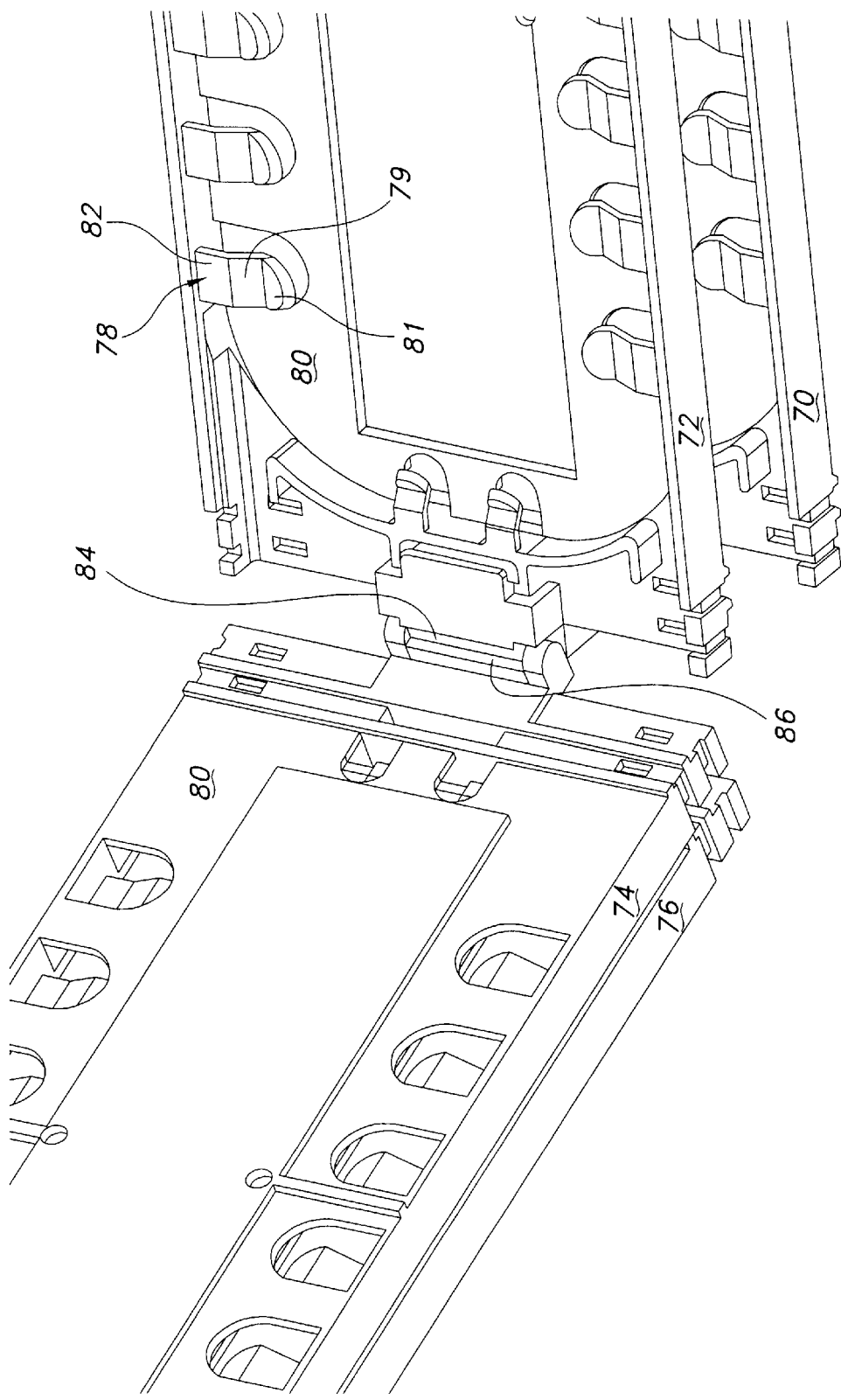
FIG. 17 is a perspective view of two splice trays constructed according to the present invention, illustrating the snap-lock pivotal connection feature.

As shown in FIG. 3 and 16, hose clamp 56 is then positioned about cable 46 and moved axially to a position encircling the cable support device 49. Thereafter hose clamp 56 is tightened by turning screw 59, until it engages the fingers of cable support device 49. Continued tightening of screw 59 causes the fingers 48, 50 of support device 49 to tightly bite and grip cable 46 so as to fix the position of the cable with respect to the end plate 36 and the enclosure 10. Radial lips 60, 62 are provided at the free ends of fingers 48, 50 as best shown in FIGS. 9–10 to prevent the hose clamp 56 from sliding off the support sleeve 49.

Referring again to the drawings and particularly to FIG. 19, fingers 48, 50 of split bushing 49 each include an arcuately shaped circumferential groove 64, 66 at the inner end where fingers 48, 50 interface with washer-like halves 48d, 50d. These grooves 64, 66 provide flexibility to fingers 48, 50 and thus act as a "living hinge" on fingers 48, 50 when cable 46 is gripped therebetween, due to the resilient material from which the bushing 49 is made.

Figure 20:
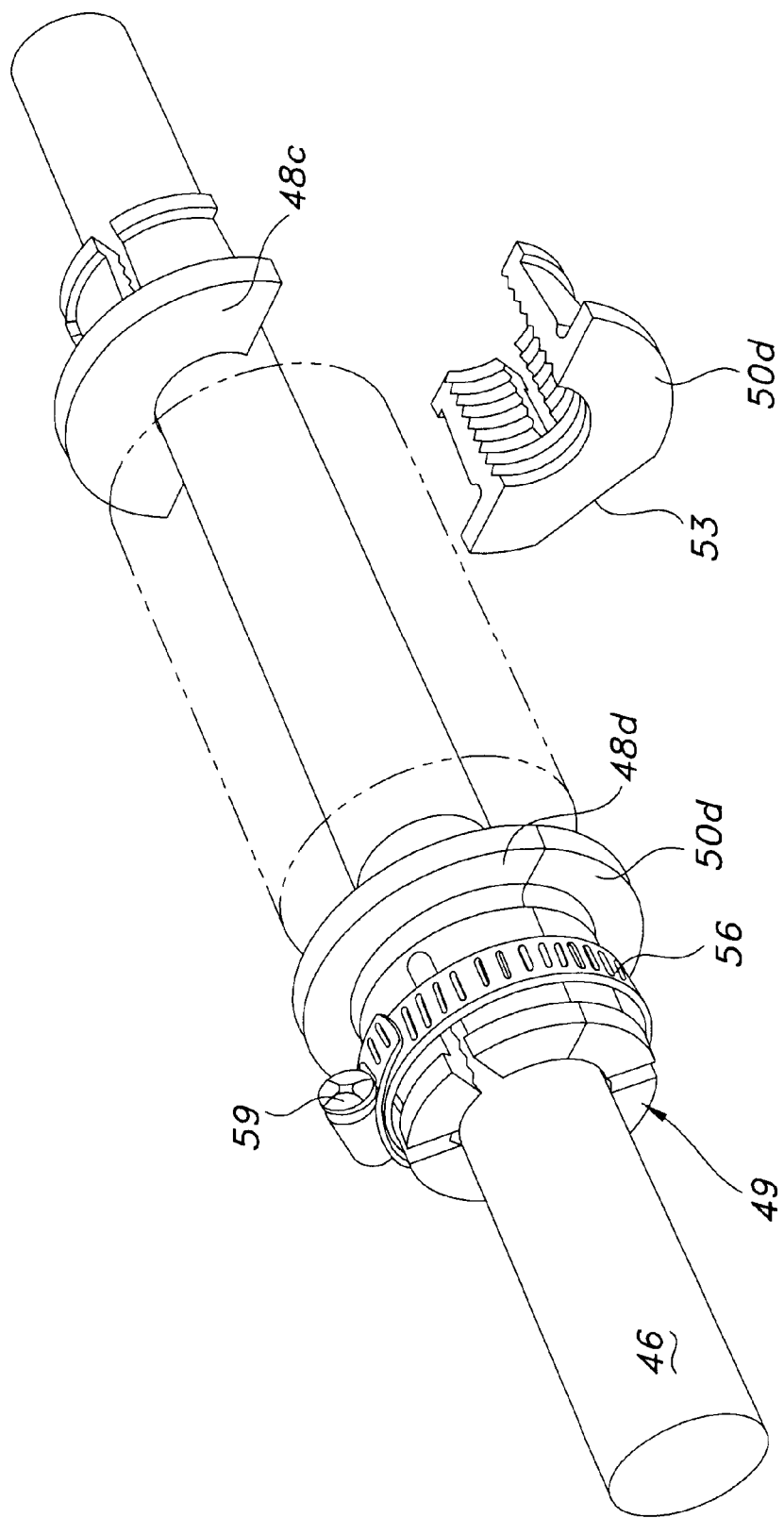
FIG. 20 is a perspective view from above similar to FIG. 19, illustrating the use of an elastomeric grommet or sealant located between the two split strain relief support systems and the end plates to hermetically seal the interface between the end plates and the cables.

Alternatively the washer-like halves 48d, 50d may be provided with a flat surface 53 as shown for example, in FIG. 20, on the outer edge, or a bump may be added to each washer half to fit in engagement with a correspondingly shaped surface or feature in the respective washer-like slots 52, 54 in the respective end plate, to prevent the cable 46 from twisting or tension movement of any type.

As noted, preferably the split cable support bushing 49 is made of a polyamide such as nylon. Alternatively, other suitable materials include polyolefins such as polyethylene, polypropylene, polybutylene, or the like.

Upon completion of the assembly, it can be seen that the cable 46 is supported firmly within the enclosure 10 with limited flexibility in movement and minimum stress or strain on the cable. It can be seen that with the cable support system as described, a relatively substantial and distributed gripping force may be applied to the cable to secure its position in fixed relation with respect to the enclosure 10, while minimizing the stress or strain to which the cable may be subjected. Elastomeric grommet 41 is positioned in encircling relation with cable 46 between split bushings 49 to provide a water resistant seal therebetween. Mastic or silicone type sealants are preferred for use with elastomeric grommet 41 to provide a water-tight seal.

As noted, in another embodiment, each cable opening in the end plate assemblies can be provided with a cable strength bracket located inside the closure to secure elongated wire-like strength members of the cables.

Referring again to FIG. 3, there is shown a plurality of fiber optic cable splice rays 70, 72, 74 and 76 which are substantially rigidly connected to each other for receiving and supporting optical fibers extending through the enclosure 10 and emanating from fiber optic cables at both ends of the enclosure. The trays 70–76 are generally intended to support respective optical fibers in face-to-face relation generally having an in-line mechanical splice or butt-splice interface in which the ends are fusion welded together to form a fusion weld splice.

Figure 11:
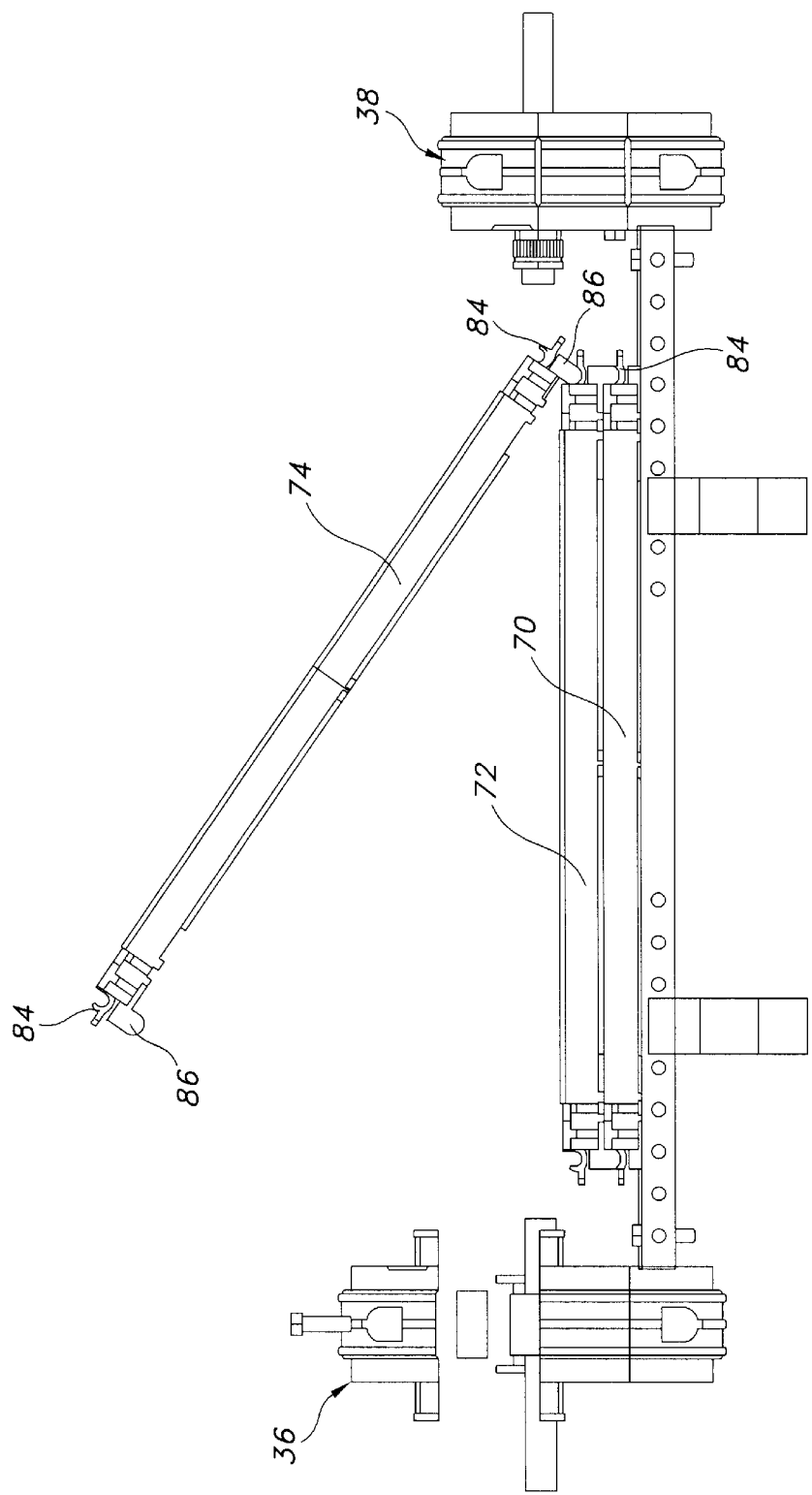
FIG. 11 is a side elevational view of the fiber optic cable splice trays contained in the closure assembly of the previous Figs., illustrating the snap-lock pivotal attachment feature constructed according to the present invention.
Figure 12:
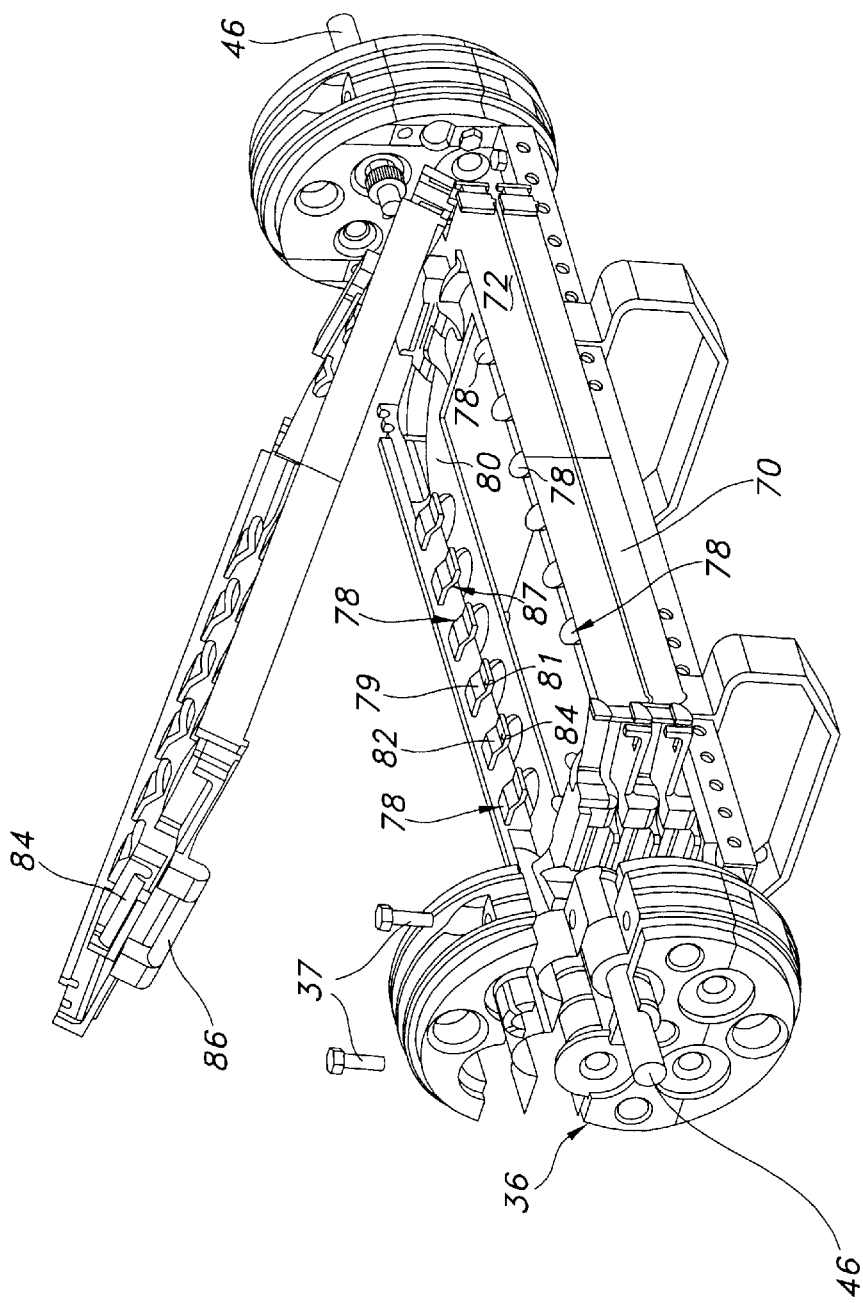
FIG. 12 is a perspective view from above, of the end plates of the closure assembly and the pivotally attached splice trays constructed according to the invention.
Figure 18:
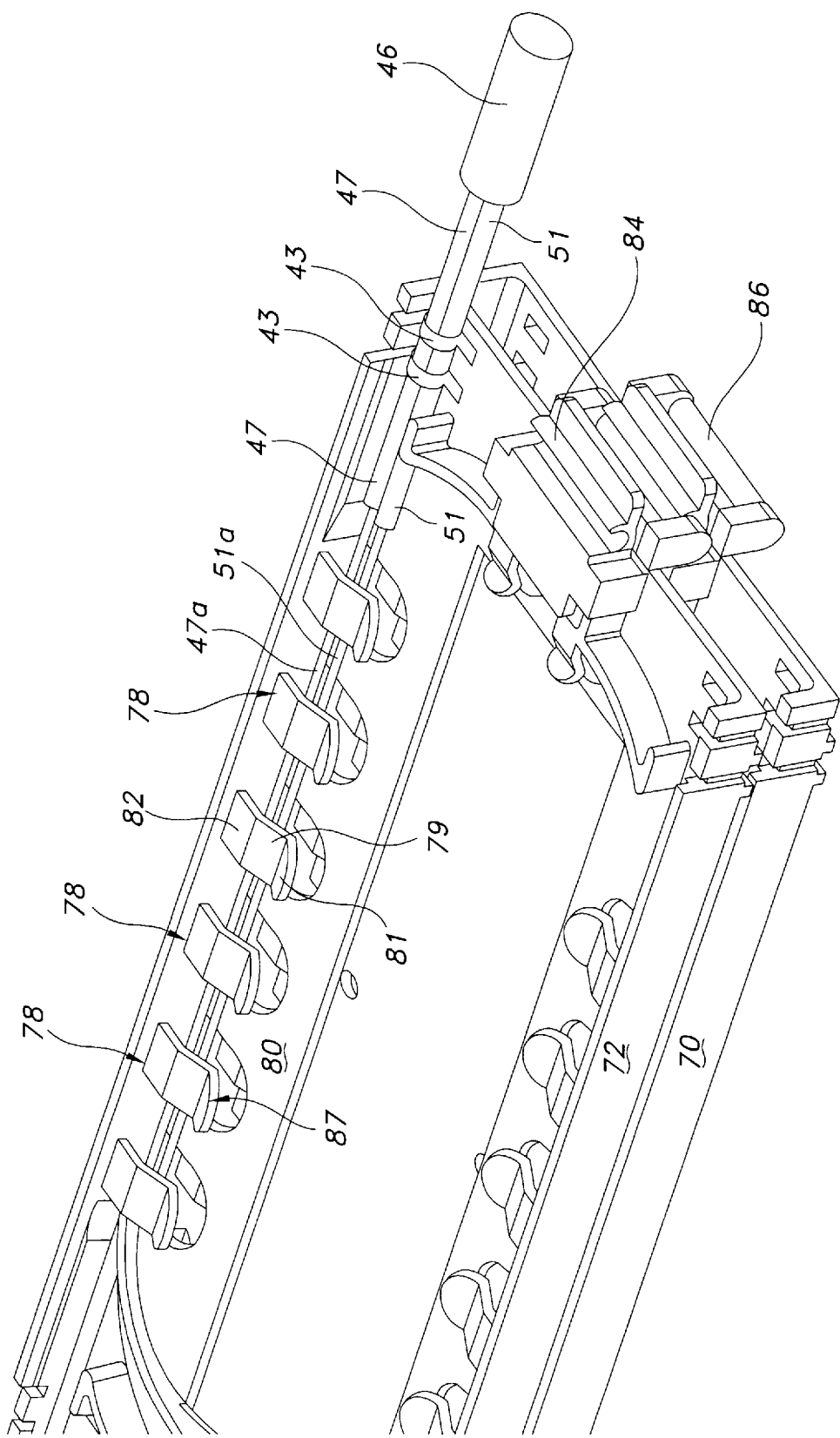
FIG. 18 is a perspective view from above, of the splice trays of FIG. 16, pivotally rotated to respective face-to-face working relation and showing optical fiber containing buffer tubes which emanate from the fiber optic cable and are secured in position by retaining clamps, with the optical fibers emerging from the buffer tubes and retained in position on the tray by the unique fiber retention fingers of the invention.

Referring now to FIG. 11, the optical fiber support trays 70, 72 and 74, are attached as shown and are pivotally movable with respect to each other as shown. Each tray includes a plurality of spring like optical fiber-gripping fingers 78 which may be lifted upwardly away from base plate 80 to receive and support the optical fibers 46a, 46b from cable 46 securely on both sides of an in-line mechanical splice or fusion weld splice and in gripped relation elsewhere along the fibers, as can be seen in FIGS. 12 and 18. Fiber support trays 70, 72 are generally made of a high impact thermoplastic such as ABS, polycarbonate or the like.

Referring again to FIG. 12, optical fiber retention fingers 78 each have a cross-sectional shape comprised of a horizontal member 82 and a "V"-shaped section 87 having one downwardly extending leg 79 and one upwardly extending leg 81. Since fingers 78 are formed monolithically with the resilient support tray, they are resiliently connected to base 80 over slots 85 so as to receive optical fibers 46a which are generally closely positioned in the fiber optic cable 46, but which are separated from the cable outer sheath emerging therefrom at a location proximal of end plate 36. As best shown in FIG. 12, fiber optic cable 46 enters the closure assembly 10 through end plate 36. The end of the sheath of cable 46 is sealed to prevent water from entering the sheath. Buffer tubes 47, 51 are provided to retain the optical fibers 47a, 51a in separate bundles as shown. Buffer tubes 47, 51 are retained in position on exemplary tray 72 by cable ties 43. At a location proximal of cable ties 43, the individual bunched exemplary optical fibers 47a, 51a emerge from the buffer tubes 47, 51 and are retained in position under fingers 78 as shown in FIG. 18. Fingers 78 are uniquely shaped as shown, and permit a user to lift the finger 78 by inserting the user's finger under the "V" shaped section formed by legs 79, 81 to remove and/or insert the fibers.

Figure 21:
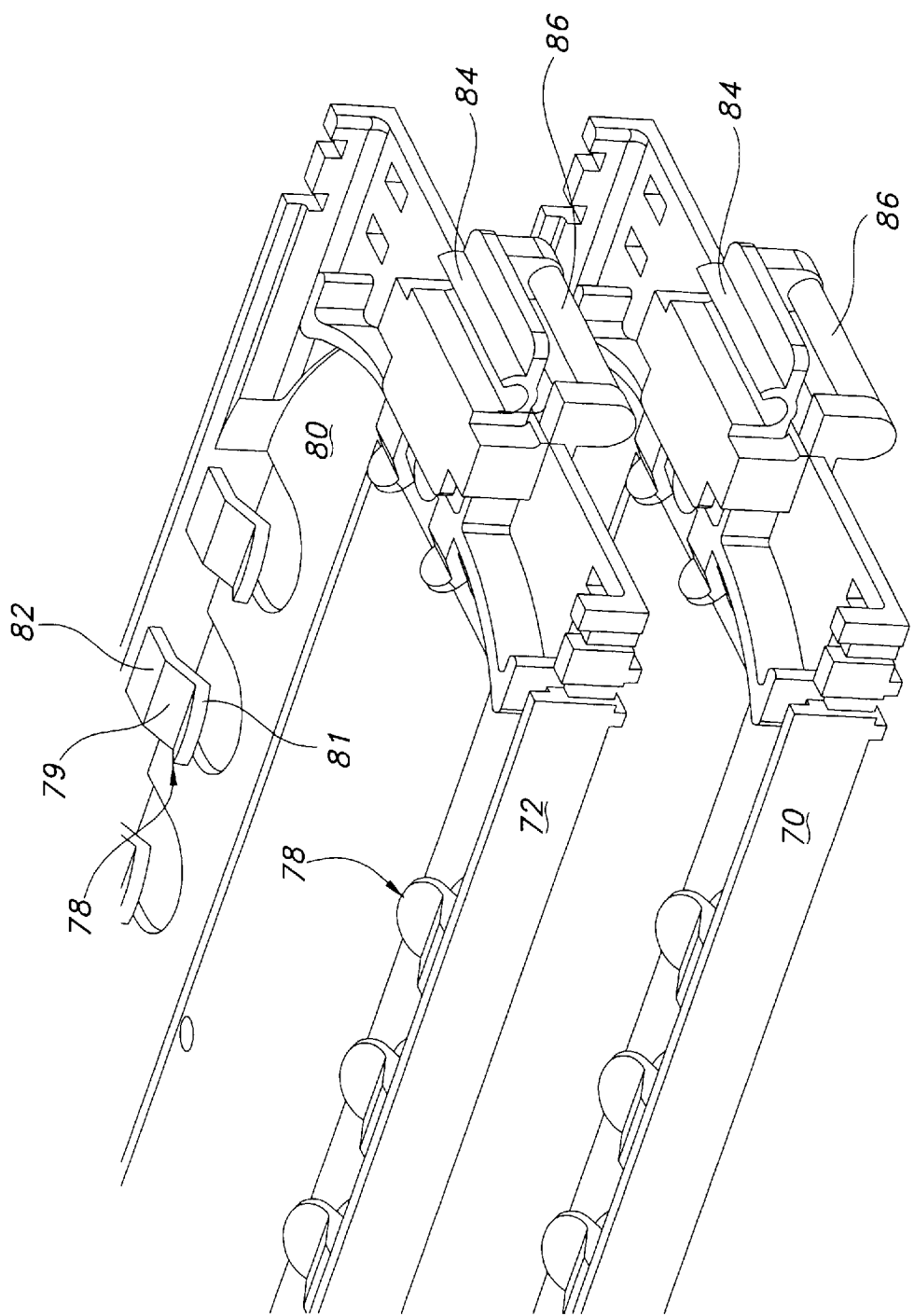
FIG. 21 is a partial perspective view of a pair of splice trays, separated for convenience of illustration, and illustrating the snap-lock pivotal attachment feature constructed according to the invention.
Figure 22:
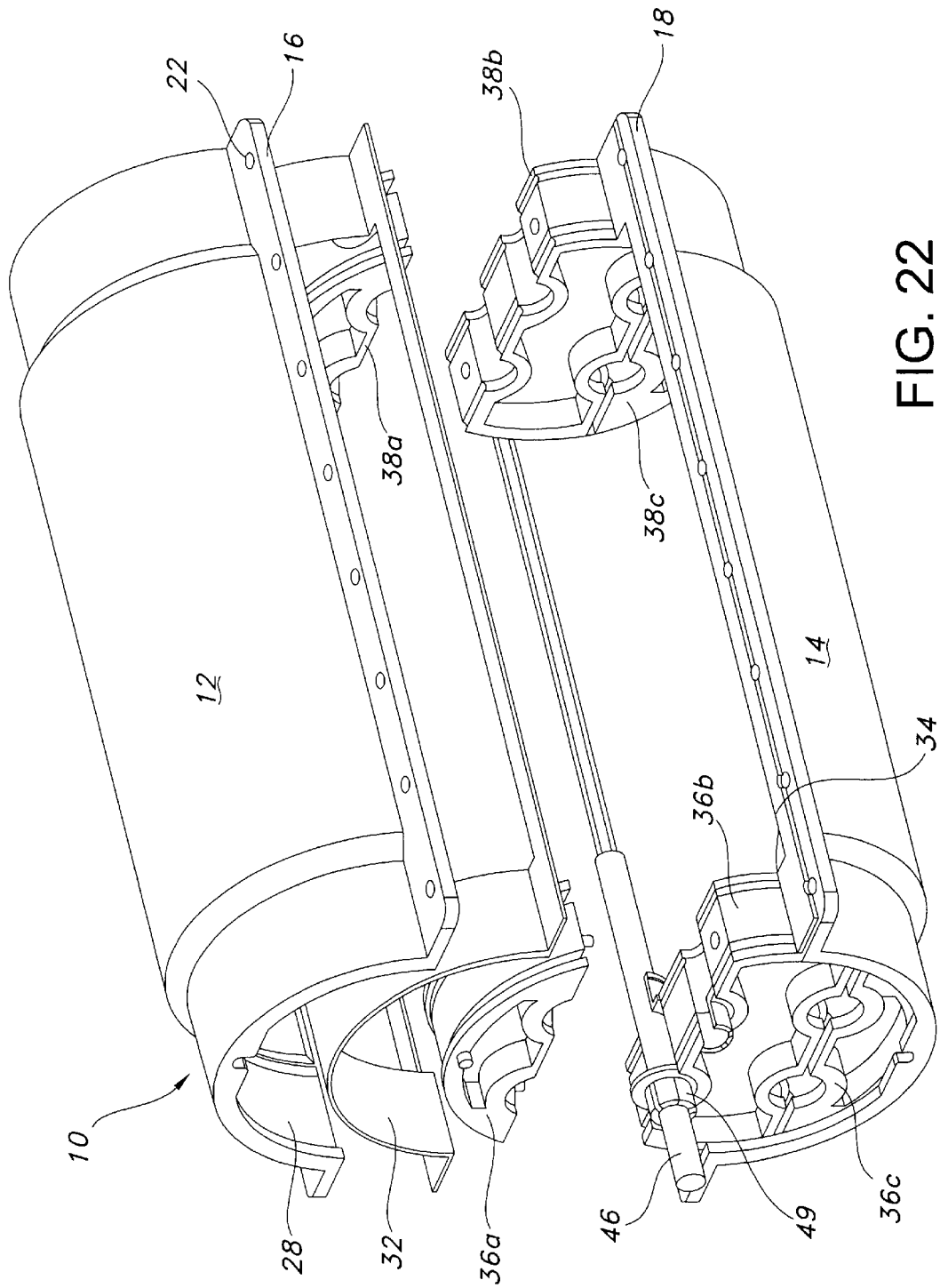
FIG. 22 is a perspective view from above, of the closure assembly illustrated in the previous Figs., with parts separated for convenience of illustration, and showing an exemplary cable partially assembled with the end plates and the closure assembly.
Figure 23:
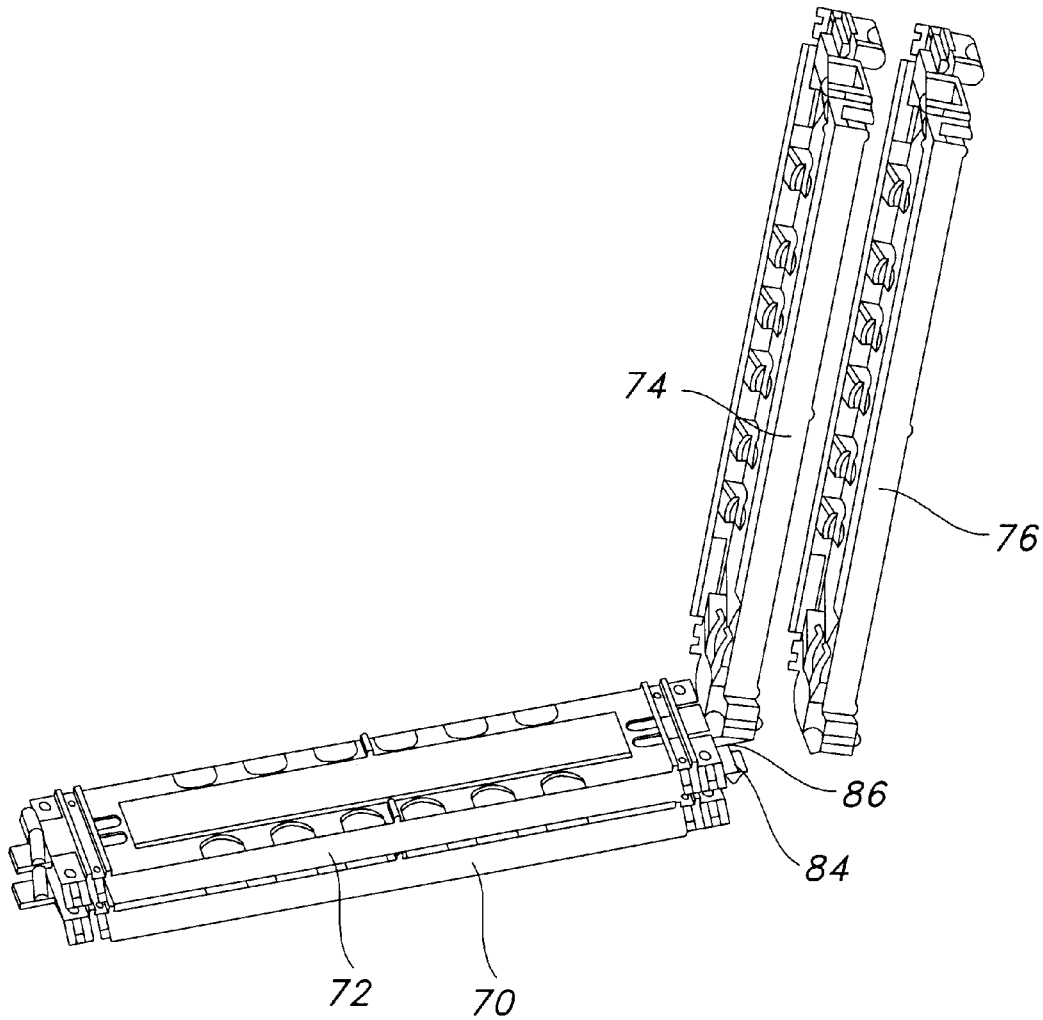
FIG. 23 is a perspective view of the splice trays constructed according to the invention, illustrating the snap-lock pivotal attachment feature which permits relative pivotal movement of the trays at either end.
Figure 24:
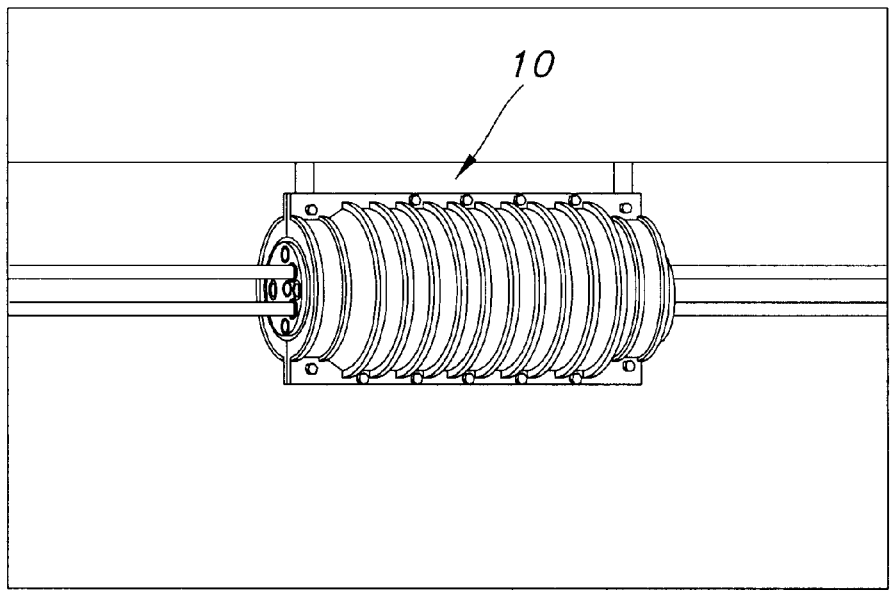
FIG. 24 is a perspective view of a closure assembly constructed according to the invention, and mounted in position at a work site.
Figure 25:
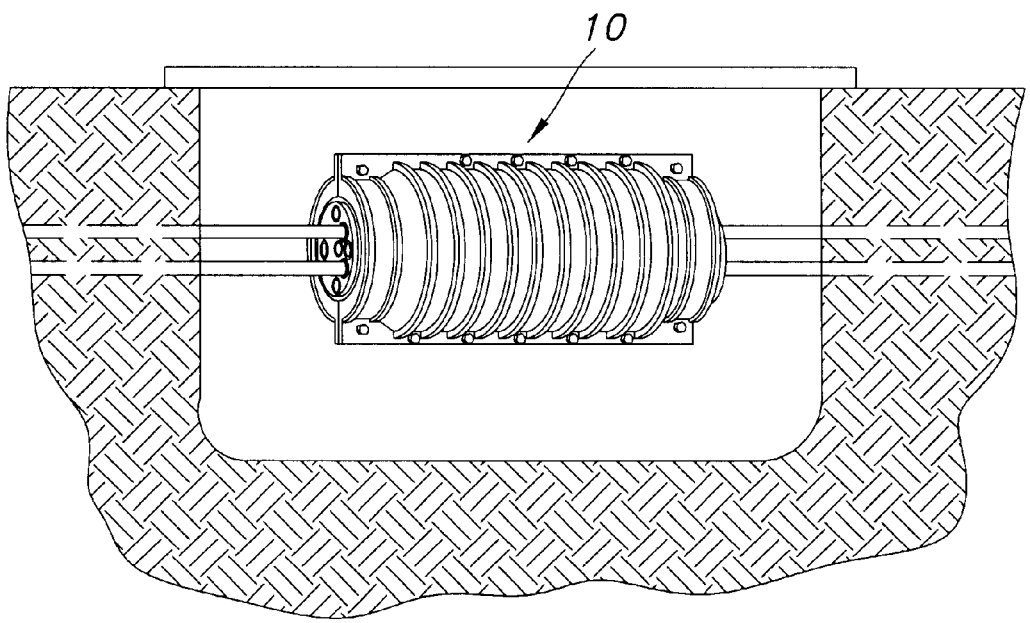
FIG. 25 is a view similar to FIG. 24.

Referring now to FIGS. 18, 21 and 23, the snap-lock feature of the splice trays is best illustrated wherein tray 70 includes upper female end connector 84 and adjacent lower male cylindrical end connector 86. The trays are stacked vertically upon each other as shown such that male rod-like member 86 is snapped into the female connector 84 which has a generally "C" shaped cross-sectional upper section and is dimensioned to receive the cylindrical male rod-like member 86 of the next adjacent tray in engaged or clamped relation. Identical connectors are provided at the opposite end of each tray to permit vertical stacking of the trays in snapped relation and in numbers according to space and needs. The unique structure of the end connectors 84, 86 permits pivoting each tray with respect to the next adjacent tray by lifting one end so as to disengage the snapped connection 84, 86 and pivoting the tray upwardly about the opposite end connector 84, 86 as best seen in FIGS. 11, 12, 13, 17 and 18. Thus either end of any tray may be lifted and pivoted upwardly away from the next adjacent tray as seen in the drawings and the trays may be reconnected and attached to each other in stacked relation. Moreover, as noted, the optical fiber(s) may be removed from a tray by lifting the novel fingers 78 upwardly manually by lifting the upwardly extending leg of the V-shaped finger tray. Thus the features of snap-locked pivotal trays and cable retention devices as disclosed herein permit removal of the cables and related optical fibers for repairs and/or welds, with minimum inconvenience and disruption to the remaining cables or optical fibers enclosed therein.

What is claimed is:

1. An enclosure for supporting at least one fiber optic cable, which comprises:

(a) housing having first and second end portions;

(b) at least one end plate located at each said end portion, each said end plate defining at least one aperture for supporting at least one fiber optic cable extending therethrough;

(c) a strain relief device for gripping said at least one fiber optic cable adjacent at least one of said end plates, said gripping device having a plurality of spaced apart arcuately shaped fingers for substantially encircling the cable and having at least one extension adapted for attachment to said at least one end plate to fix the axial position of the cable gripped thereby; and (d) a clamp member for encircling said gripping device and for urging said fingers into biting engagement with said at least one cable.

2. The enclosure for supporting at least one fiber optic cable according to claim 1, wherein said gripping device is structured to grip the cable about an outer surface portion thereof in a generally uniform manner such that the gripping force is generally uniformly distributed so as to avoid distortion of the cable.

3. The enclosure for supporting at least one fiber optic cable according to claim 2, wherein said gripping device is adapted to grip the cable generally uniformly about the outer surface portion thereof.

4. The enclosure for supporting at least one fiber optic cable according to claim 3, wherein said cable gripping device comprises a split bushing having a washer-shaped flange member extending radially therefrom.

5. The enclosure for supporting at least one fiber optic cable according to claim 4, wherein said cable gripping device further comprises a radially extending lip at a free end opposite said washer-shaped flange member.

6. The enclosure for supporting at least one fiber optic cable according to claim 5, wherein said flange member is comprised of a half section of a washer-like member attached at one end to said arcuate shaped fingers.

7. The enclosure for supporting at least one fiber optic cable according to claim 6, wherein said cable gripping member is made of a synthetic flexible plastic material being at least one of polyamides and polyolefins.

8. The enclosure for supporting at least one fiber optic cable according to claim 7, wherein said polyamide is nylon.

9. The enclosure for supporting at least one fiber optic cable according to claim 7, wherein said polyolefin is at least one of polyethylene, polypropylene and polybuylene.

10. A splice tray for supporting optical fibers, which comprises:
   a) a tray for supporting the optical fibers in an axial direction; and
   b) a tray-to-tray connecting device located at each end of said tray, each said connecting device being comprised of at least one elongated generally cylindrical member positioned adjacent at least one clamp member adapted to engagingly receive in clamped relation, one of such cylindrical members attached to an adjacent similar tray in a manner to permit relative pivotal movement therebetween, such that at least two of such trays may be stacked in connected relation whereby said trays may be pivotally rotated with respect to each other from either end.

11. The splice tray according to claim 10, wherein said tray defines a longitudinal axis extending in a lengthwise direction and said at least one cylindrical member is oriented transverse of said longitudinal axis.

12. The splice tray according to claim 11, wherein said clamp member is oriented transverse to said longitudinal axis.

13. The splice tray according to claim 12, wherein said clamp member has a generally "C"-shaped cross-sectional configuration and is dimensioned to engagingly receive said correspondingly positioned generally cylindrical member.

14. The splice tray according to claim 13, further comprising optical fiber securing devices for retaining the optical fibers in predetermined positions and orientations, said fiber optic securing devices being oriented generally transverse to said generally longitudinal axis for retaining the optical fibers in position generally parallel to said generally longitudinal axis.

15. The splice tray according to claim 13, wherein said optical fiber securing devices are attached to said splice tray at one end and have a generally "V"-shaped cross-sectional configuration at the free end.

16. The splice tray according to claim 15, wherein said optical fiber securing devices each comprise an elongated finger resiliently attached to said tray for resiliently retaining the optical fibers in position with respect to said tray, said generally "V"-shaped configuration comprising one downwardly extending leg and one upwardly extending leg at the free end to facilitate lifting said finger to position the optical fibers thereunder for retention with respect to said tray.

17. The splice tray according to claim 16, wherein said fiber optic hold down fingers are formed monolithically with said tray.

18. A device for supporting a fiber optic cable with respect to an enclosure, the enclosure having at least two end portions, and an end plate at each said end portion defining at least one aperture for reception of the fiber optic cable, which comprises:
   (a) gripping device structured to substantially encircle the cable at a location adjacent at least one of said end plates, said gripping device having at least two gripping members adapted to move toward and away from an outer surface portion of the cable between positions whereby the cable is gripped and released, respectively;
   (b) a split washer-like member extending generally radially from said gripping device at at least one end portion thereof, said member adapted to be fixedly attached to the end plate; and
   (c) an encircling member adapted to encircle said gripping device and to selectively apply inward force to said gripping device to cause said gripping device to grip the cable.

19. The enclosure for supporting at least one fiber optic cable according to claim 18, wherein said gripping member has an inner ribbed surface to enhance the grip applied to the cable.

20. The enclosure for supporting at least one fiber optic cable according to claim 19, wherein said encircling member is a band-type clamp.

21. The enclosure for supporting at least one fiber optic cable according to claim 20, wherein said band-type clamp includes a threaded member adapted to adjustably cause said band-type clamp to be selectively increased and reduced in circumferential size to permit application of inward force to said gripping member.

* * * * *

UNITED STATES PATENT AND TRADEMARK OFFICE
CERTIFICATE OF CORRECTION

PATENT NO. : 6,533,472 B1
DATED : March 18, 2003
INVENTOR(S) : Dinh et al.

It is certified that error appears in the above-identified patent and that said Letters Patent is hereby corrected as shown below:

Column 9,
Line 29, delete "...polypropylene and polybuylene..." and insert -- polypropylene and polybutylene --.

Signed and Sealed this

Fourteenth Day of October, 2003

JAMES E. ROGAN
*Director of the United States Patent and Trademark Office*